(12) United States Patent
Kim et al.

(10) Patent No.: US 12,408,074 B2
(45) Date of Patent: Sep. 2, 2025

(54) METHOD AND APPARATUS OF DATA TRANSMISSION FOR HIGH CAPACITY NETWORK

(71) Applicant: ELECTRONICS AND TELECOMMUNICATIONS RESEARCH INSTITUTE, Daejeon (KR)

(72) Inventors: Jun Sik Kim, Daejeon (KR); Soon Gi Park, Daejeon (KR); Young Jo Ko, Daejeon (KR); Seok Bong Hyun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 18/525,714

(22) Filed: Nov. 30, 2023

(65) Prior Publication Data

US 2024/0187926 A1 Jun. 6, 2024

(30) Foreign Application Priority Data

Dec. 2, 2022 (KR) .................. 10-2022-0166489
Nov. 22, 2023 (KR) .................. 10-2023-0163860

(51) Int. Cl.
*H04W 28/06* (2009.01)
*H04W 28/086* (2023.01)

(52) U.S. Cl.
CPC ......... *H04W 28/06* (2013.01); *H04W 28/086* (2023.05)

(58) Field of Classification Search
CPC ... H04W 28/06; H04W 28/086; H04W 24/02; H04W 84/00; H04L 43/00; H04L 41/16; H04L 41/0893; H04L 41/0816; H04L 41/142; H04L 43/0847; G06Q 10/06393
See application file for complete search history.

(56) References Cited

U.S. PATENT DOCUMENTS

| | | | |
|---|---|---|---|
| 10,064,080 B2 | 8/2018 | Yi et al. | |
| 10,893,459 B2 | 1/2021 | Ode et al. | |
| 11,323,929 B2 | 5/2022 | Byun et al. | |
| 2010/0136994 A1 | 6/2010 | Kim et al. | |
| 2010/0304682 A1 | 12/2010 | Choi et al. | |
| 2012/0028665 A1 | 2/2012 | Kwon et al. | |
| 2015/0117210 A1* | 4/2015 | Yang | H04W 24/02 370/235 |
| 2015/0312878 A1* | 10/2015 | Ogata | H04W 24/08 455/456.6 |

(Continued)

*Primary Examiner* — Gary Mui
*Assistant Examiner* — Adam Lane Rusterholz
(74) *Attorney, Agent, or Firm* — Rabin & Berdo, P.C.

(57) ABSTRACT

A method of a central unit (CU) may comprise: receiving, from a terminal, measurement information for radio access points; configuring a cluster using two or more radio access points among the radio access points based on the measurement information; and generating first data to which a cluster header including a cluster identifier of the cluster is attached; and transmitting the first data to the two or more radio access points, wherein second data generated in the two or more radio access points includes the first data and a packet data convergence protocol (PDCP) header, the CU performs a first partial PDCP function, and the two or more radio access points perform a second partial PDCP function.

16 Claims, 27 Drawing Sheets

(56) References Cited

U.S. PATENT DOCUMENTS

| | | | |
|---|---|---|---|
| 2015/0312904 A1* | 10/2015 | Ma | H04L 12/6418 |
| | | | 370/329 |
| 2016/0157145 A1 | 6/2016 | Brueck et al. | |
| 2016/0192379 A1* | 6/2016 | Behravan | H04L 5/001 |
| | | | 370/329 |
| 2017/0163315 A1* | 6/2017 | Wu | H04L 25/0202 |
| 2017/0339733 A1* | 11/2017 | Kurian | H04W 76/23 |
| 2018/0184428 A1* | 6/2018 | Cariou | H04W 12/06 |
| 2018/0249401 A1* | 8/2018 | Zhou | H04W 24/02 |
| 2019/0045583 A1* | 2/2019 | Van Phan | H04J 11/0093 |
| 2020/0358580 A1 | 11/2020 | Kim et al. | |
| 2021/0051448 A1 | 2/2021 | Jung et al. | |
| 2021/0127278 A1* | 4/2021 | Ergen | H04W 88/08 |
| 2021/0152427 A1 | 5/2021 | Kim et al. | |
| 2021/0160823 A1 | 5/2021 | Cho et al. | |
| 2021/0250735 A1 | 8/2021 | Hao et al. | |

* cited by examiner

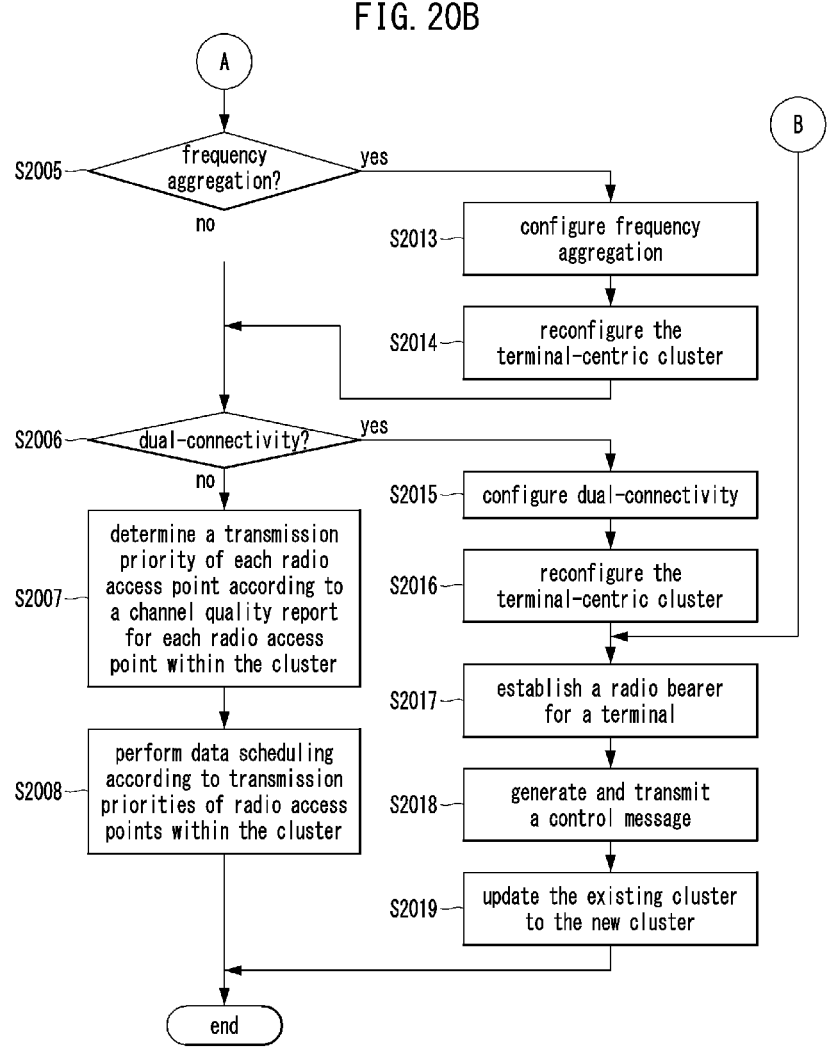

METHOD AND APPARATUS OF DATA TRANSMISSION FOR HIGH CAPACITY NETWORK

CROSS-REFERENCE TO RELATED APPLICATIONS

This application claims priority to Korean Patent Applications No. 10-2022-0166489, filed on Dec. 2, 2022, and No. 10-2023-0163860, filed on Nov. 22, 2023, with the Korean Intellectual Property Office (KIPO), the entire contents of which are hereby incorporated by reference.

BACKGROUND

1. Technical Field

Exemplary embodiments of the present disclosure relate to a data transmission technique in a high capacity transmission network, and more specifically, to a data transmission technique for a high capacity transmission network that enables high capacity transmission by configuring a terminal-centric cluster through utilization of a plurality of radio access points.

2. Related Art

With the development of information and communication technology, various wireless communication technologies have been developed. Typical wireless communication technologies include long term evolution (LTE), new radio (NR), 6th generation (6G) communication, and/or the like. The LTE may be one of 4th generation (4G) wireless communication technologies, and the NR may be one of 5th generation (5G) wireless communication technologies.

For the processing of rapidly increasing wireless data after the commercialization of the 4th generation (4G) communication system (e.g., Long Term Evolution (LTE) communication system or LTE-Advanced (LTE-A) communication system), the 5th generation (5G) communication system (e.g., new radio (NR) communication system) that uses a frequency band (e.g., a frequency band of 6 GHz or above) higher than that of the 4G communication system as well as a frequency band of the 4G communication system (e.g., a frequency band of 6 GHz or below) is being considered. The 5G communication system may support enhanced Mobile BroadBand (eMBB), Ultra-Reliable and Low-Latency Communication (URLLC), and massive Machine Type Communication (mMTC).

In a communication system of this nature, the utilization of ultra-high frequency bands offers the advantage of a large bandwidth, facilitating the allocation of consecutive wireless resources. This, in turn, can lead to increased capacity. However, it's worth noting that ultra-high frequency bands are characterized by strong straight-line propagation, posing challenges in configuring cellular networks due to severe propagation loss. As a result, these bands are often primarily employed in specific domains such as in-device communication, short-distance peer-to-peer (P2P) communication, data centers, and wireless backhaul. In parallel, beamforming techniques leveraging multiple antennas find applications in mobile communication systems. Ongoing research is exploring the integration of ultra-high frequency bands, including a terahertz band, in mobile communications. For ultra-high frequency mobile communication wireless access, advanced approaches like ultra-fine beamforming techniques based on large-scale antenna arrays and distributed multi-point multi-antenna techniques are being investigated. These innovations aim to enhance system capacity and overall performance. Moreover, the evolution toward ultra-high frequency mobile communication wireless access is anticipated to shift traditional cell-centric wireless access models to more flexible, beam-based terminal-centric approaches. This transformation may necessitate the development of data transmission techniques suitable for a high-capacity transmission network in this context.

SUMMARY

Exemplary embodiments of the present disclosure are directed to providing a method and an apparatus for data transmission for a high capacity transmission network that enables high capacity transmission by configuring a terminal-centric cluster through utilization of a plurality of radio access points.

According to a first exemplary embodiment of the present disclosure, a method of a central unit (CU) may comprise: receiving, from a terminal, measurement information for radio access points; configuring a cluster using two or more radio access points among the radio access points based on the measurement information; and generating first data to which a cluster header including a cluster identifier of the cluster is attached; and transmitting the first data to the two or more radio access points, wherein second data generated in the two or more radio access points includes the first data and a packet data convergence protocol (PDCP) header, the CU performs a first partial PDCP function, and the two or more radio access points perform a second partial PDCP function.

The configuring of the cluster using the two or more radio access points among the radio access points based on the measurement information may comprise: configuring a radio access point having a maximum received signal strength among the radio access points as a reference radio access point based on the measurement information; identifying one or more radio access points having a received signal strength equal to or greater than a threshold among remaining radio access points excluding the reference radio access point among the radio access points; and configuring the cluster including the reference radio access point and the one or more radio access points.

The method may further comprise: generating the cluster identifier using an identifier of the CU and a group identifier of the two or more radio access points constituting the cluster; and delivering the cluster identifier to the two or more radio access points.

The cluster header may include at least one of information on a number of PDCP service data units (SDUs), a duplicate transmission tag, or information on a length of the SDU.

The method may further comprise: determining whether to apply an intra-frequency multi-connectivity technique by determining frequency ranges of the two or more radio access points constituting the cluster; and reconfiguring the cluster using radio access points capable of applying the intra-frequency multi-connectivity technique among the two or more radio access points.

The method may further comprise: determining whether to apply a cooperative communication technique to the two or more radio access points constituting the cluster; and reconfiguring the cluster using radio access points capable of applying the cooperative communication technique among the two or more radio access points.

The method may further comprise: determining whether to apply a frequency aggregation technique to the two or more radio access points constituting the cluster; and reconfiguring the cluster using radio access points capable of applying the frequency aggregation technique among the two or more radio access points.

The method may further comprise: determining whether to apply a dual-connectivity technique to the two or more radio access points constituting the cluster; and reconfiguring the cluster using radio access points capable of applying the dual-connectivity technique among the two or more radio access points.

The method may further comprise: receiving, from the terminal, a channel quality report for the two or more radio access points constituting the cluster; determining transmission priorities of the two or more radio access points based on the channel quality report; and performing data scheduling according to the transmission priorities of the two or more radio access points.

The method may further comprise: receiving, from the terminal, periodic measurement reports; and updating the cluster based on the periodic measurement reports.

According to a second exemplary embodiment of the present disclosure, a central unit (CU) may comprise a processor, wherein the processor may cause the CU to perform: receiving, from a terminal, measurement information for radio access points; configuring a cluster using two or more radio access points among the radio access points based on the measurement information; and generating first data to which a cluster header including a cluster identifier of the cluster is attached; and transmitting the first data to the two or more radio access points, wherein second data generated in the two or more radio access points includes the first data and a packet data convergence protocol (PDCP) header, the CU performs a first partial PDCP function, and the two or more radio access points perform a second partial PDCP function.

In the configuring of the cluster using the two or more radio access points among the radio access points based on the measurement information, the processor may further cause the CU to perform: configuring a radio access point having a maximum received signal strength among the radio access points as a reference radio access point based on the measurement information; identifying one or more radio access points having a received signal strength equal to or greater than a threshold among remaining radio access points excluding the reference radio access point among the radio access points; and configuring the cluster including the reference radio access point and the one or more radio access points.

The processor may further cause the CU to perform: generating the cluster identifier using an identifier of the CU and a group identifier of the two or more radio access points constituting the cluster; and delivering the cluster identifier to the two or more radio access points.

The processor may further cause the CU to perform: determining whether to apply an intra-frequency multi-connectivity technique by determining frequency ranges of the two or more radio access points constituting the cluster; and reconfiguring the cluster using radio access points capable of applying the intra-frequency multi-connectivity technique among the two or more radio access points.

The processor may further cause the CU to perform: determining whether to apply a cooperative communication technique to the two or more radio access points constituting the cluster; and reconfiguring the cluster using radio access points capable of applying the cooperative communication technique among the two or more radio access points.

The processor may further cause the CU to perform: determining whether to apply a frequency aggregation technique to the two or more radio access points constituting the cluster; and reconfiguring the cluster using radio access points capable of applying the frequency aggregation technique among the two or more radio access points.

The processor may further cause the CU to perform: determining whether to apply a dual-connectivity technique to the two or more radio access points constituting the cluster; and reconfiguring the cluster using radio access points capable of applying the dual-connectivity technique among the two or more radio access points.

According to the present disclosure, a plurality of radio access points may form a terminal-centric cluster for large-capacity transmission based on at least one of a coordinated multi-point transmission and reception (COMP), carrier aggregation (CA), dual-connectivity (DC), duplication transmission, or single frequency network (SFN) function. A terminal-centered cluster can be formed based on at least one of the (single frequency network) functions.

Furthermore, according to the present disclosure, the terminal-centric cluster for large-capacity transmission may perform large-capacity data transmission using any one function among the cooperative communication, frequency aggregation, dual-connectivity, duplicate transmission, or SFN, depending on statuses of radio access points. Consequently, radio resources can be allocated to prevent communication from being interrupted due to changes in the reception status of a terminal, thereby improving the performance of the communication system.

BRIEF DESCRIPTION OF DRAWINGS

FIGS. 20A and 20B are a flowchart illustrating a first exemplary embodiment of a data transmission method for a high-capacity transmission network.

DETAILED DESCRIPTION OF THE EMBODIMENTS

Figure 1:
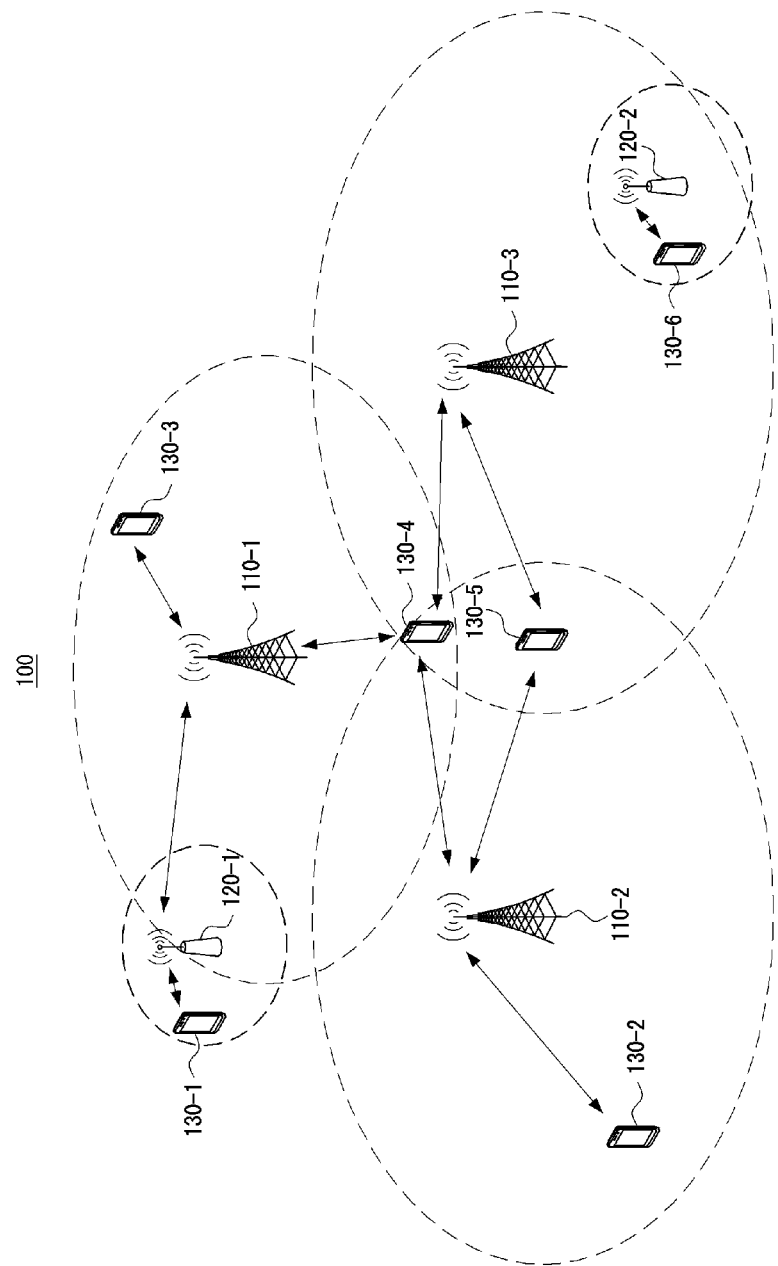
FIG. 1 is a conceptual diagram illustrating a first exemplary embodiment of a communication system.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Here, the communication system may be referred to as a 'communication network'. Each of the plurality of communication nodes may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single-carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figure 2:
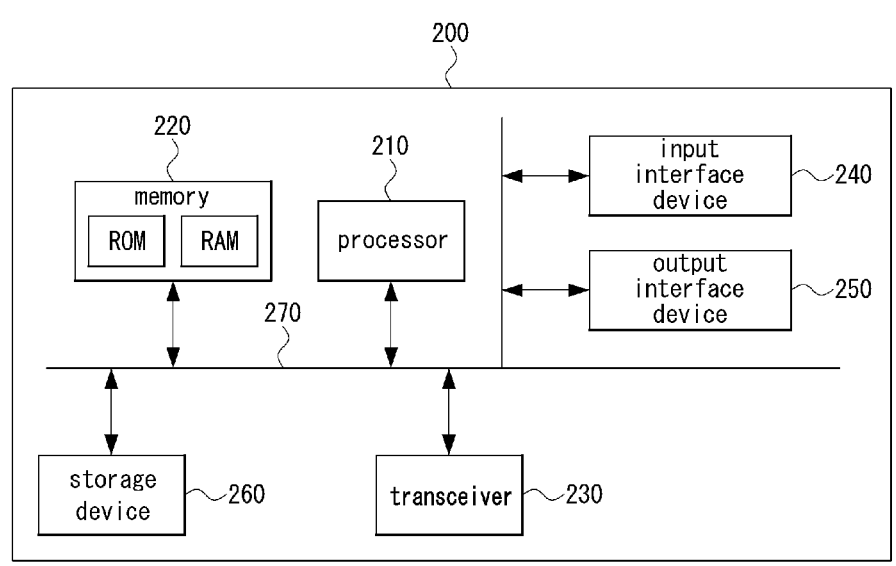
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), relay node, or the like. Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Each of the plurality of communication nodes 110-1, 110-2, 110-3, 120-1, 120-2, 130-1, 130-2, 130-3, 130-4, 130-5, and 130-6 may support cellular communication (e.g., LTE, LTE-Advanced (LTE-A), New radio (NR), etc.). Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Each of the plurality of base stations 110-1, 110-2, 110-3, 120-1, and 120-2 may support OFDMA-based downlink (DL) transmission, and SC-FDMA-based uplink (UL) transmission. In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual-connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2).

For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner. Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the COMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Meanwhile, the communication system in FIG. 1 may be a communication system based on a cell of a single base station. The traditional mobile communication network may provide a cellular network based on cell(s) formed by a single base station.

Figure 3:
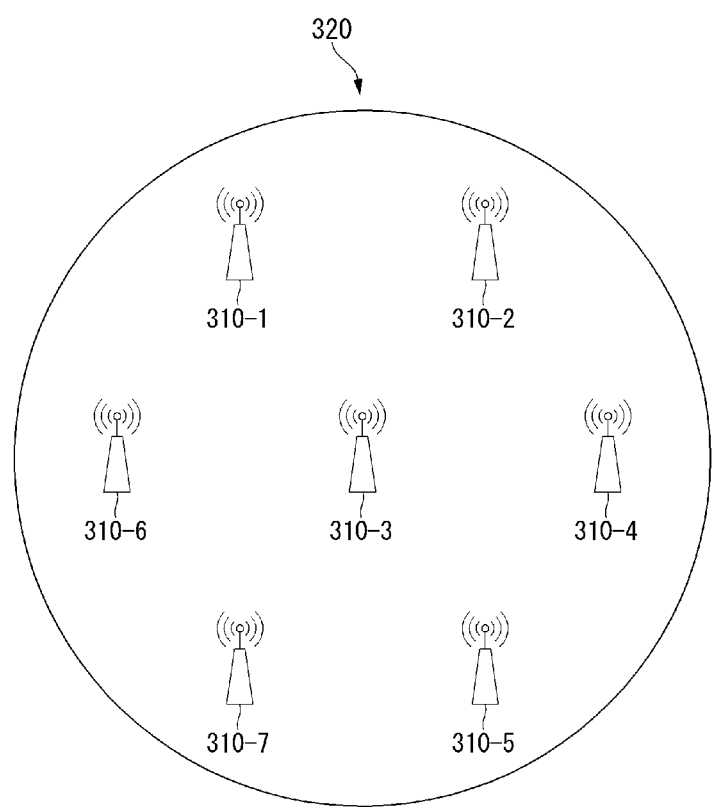
FIG. 3 is a conceptual diagram illustrating a second exemplary embodiment of a communication system.

FIG. 3 is a conceptual diagram illustrating a second exemplary embodiment of a communication system.

Referring to FIG. 3, a communication system may include a plurality of radio access points 310-1 to 310-7. The plurality of radio access points 310-1 to 310-7 may form a multi-radio access point aggregation cell 320. The multi-radio access point aggregation cell 320 configured in an ultra-high frequency band may be composed of at least one radio access point 310-1 to 310-7 to form a cellular network due to the ultra-high frequency characteristics described above. In such a dense urban network, the multi-radio access point aggregation cell 320 may be composed of a large number of radio access points 310-1 to 310-7.

Figure 4:
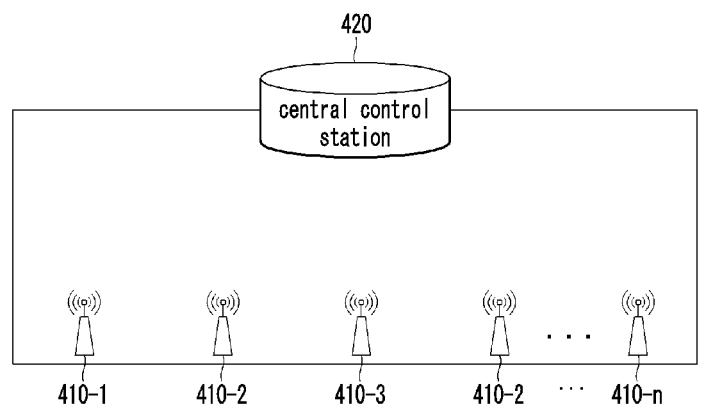
FIG. 4 is a conceptual diagram illustrating a third exemplary embodiment of a communication system.

FIG. 4 is a conceptual diagram illustrating a third exemplary embodiment of a communication system.

Referring to FIG. 4, a communication system may include a plurality of radio access points 410-1 to 410-$n$ and a central control station 420. The central control station (i.e. network side) 420 may determine a new optimal set of radio access points for a terminal from among the radio access points 410-1 to 410-$n$ according to a movement of the terminal. This flexibly optimized set of serving radio access points may provide a terminal-centric cell (i.e. logical communication coverage) to the terminal. Accordingly, the terminal-centric cell may not have a strict association with radio access points in the network in order to provide the terminal with an experience as if it were located in a center of the terminal-centric cell. Such the terminal-centric cell which is an ultra-high frequency cell may not only support the terminal's initial access and mobility between cells, but also provide synchronization signals and broadcast information. The radio access points 410-1 to 410-$n$ may configure a terminal-centric cell coverage and operate beam resources through the central control station 420.

Meanwhile, a radio access protocol may provide functions for a plurality of communication nodes to exchange data and control information using radio resources in a wireless section. The radio access protocol may be hierarchically structured. In the LTE, LTE-A, NR, and the like proposed in the $3^{rd}$ generation partnership project (3GPP), the radio access protocol may include a radio layer 1 (L1) configuring physical signals, a radio layer 2 (L2) controlling wireless transmissions through radio resources shared by multiple communication nodes and transmitting and matching data to a counterpart node, and a radio layer 3 (L3) performing network information sharing, radio connection management, mobility management, quality of service (QOS) management, and related functions for multiple communication nodes participating in the wireless network.

Here, L1 may be a physical (PHY) layer and may provide functions for data transmission. L2 may comprise sublayers including a medium access control (MAC), radio link control (RLC), packet data convergence protocol (PDCP), service data adaptation protocol (SDAP), and the like. L3 may be a radio resource control (RRC) layer and may provide access stratum (AS) layer control functions.

Figure 5:
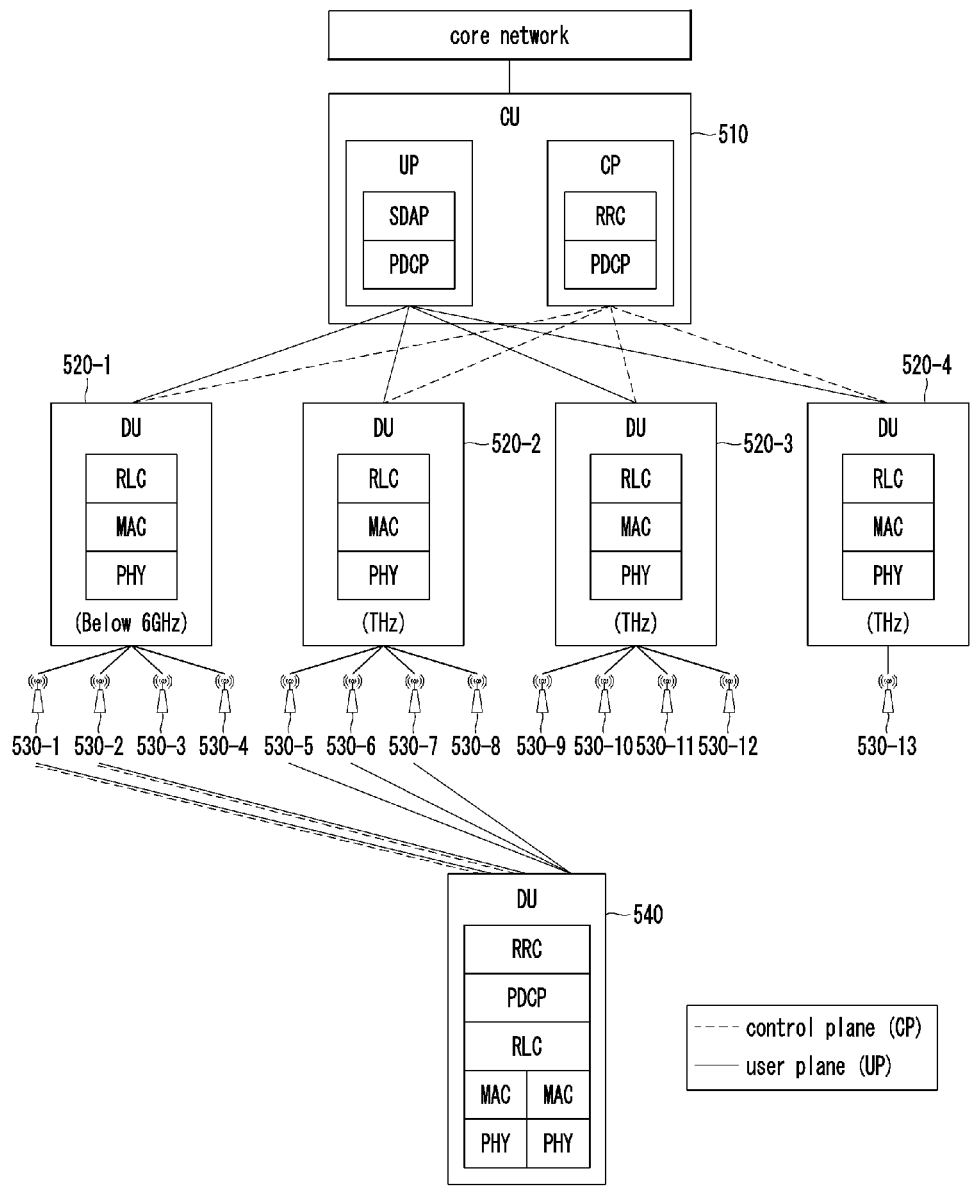
FIG. 5 is a conceptual diagram illustrating a first exemplary embodiment of a terminal-centric cluster configured based on a functional split-applied base station.

FIG. 5 is a conceptual diagram illustrating a first exemplary embodiment of a terminal-centric cluster configured based on a functional split-applied base station.

Referring to FIG. 5, a base station may be configured with a central unit (CU) 510, distributed units (DUs) 520-1 to 520-4, and radio access points 530-1 to 530-13.

Here, the CU 510 of the base station may be a logical node that performs RRC, SDAP, and PDCP layer functions of the radio access protocol, and may control operations of at least one DU 520-1 to 520-4. The CU 510 of the base station may be connected to a termination node of a core network using a backhaul link based on an SI interface (in case of 3GPP LTE/LTE-A system) or NG interface (in case of 3GPP NR system). The CU 510 of the base station may have a user plane (UP) that performs the SDAP and PDCP functions and a control plane (CP) that performs the RRC and PDCP functions.

In addition, the DUs 520-1 to 520-4 of the base station may be logical nodes that perform RLC, MAC, and PHY layer functions of the radio access protocol, and may support one or more cells. Further, the CU 510 of the base station and the DUs 520-1 to 520-4 of the base station may be connected in a wired or wireless manner using F1 interfaces of the 3GPP system. The DUs 520-1 to 520-4 of the base station may be connected to the radio access points 530-1 to 530-13 through wired or wireless Fx interfaces (or fronthaul). Each of the radio access points 530-1 to 530-13 may be configured in form of a transmission and reception point (TRP), remote radio head (RRH), relay, or repeater in the 3GPP system. Each of the radio access points 530-1 to 530-13 may perform functions of a remote unit (RU). Here, a TRP may perform both a transmission function in the downlink direction from the base station to the terminal and an uplink reception function in the opposite direction. Alternatively, a TRP may only perform a downlink transmission function from the base station to the terminal. Alternatively, a TRP may only perform an uplink reception function in the opposite direction.

In addition, each of the radio access points 530-1 to 530-13 may perform only radio frequency (RF) functions. Alternatively, each of the radio access points 530-1 to 530-13 may include some functions of the DU of the base station (e.g. physical layer and/or MAC layer) in addition to the RF functions. When the radio access points 530-1 to 530-13 include some functions of the DUs 520-1 to 520-4, they may include lower functions of the physical layer, physical layer functions, and/or lower functions of the MAC layer. Accordingly, the Fx interfaces between the DUs 520-1 to 520-4 and the radio access points 530-1 to 530-13 may be defined differently depending on what functions of the physical layer and/or MAC layer the radio access points 520-1 to 520-13 perform. Meanwhile, a portion (e.g. 530-1 to 530-7) of the radio access points may form a terminal-centric cell and provide services to a terminal 540. In this case, a first portion (e.g. 530-1 to 530-7) of the radio access points may configure a user plane, and a second portion (e.g. 530-1 and 530-2) of the radio access points may configure a control plane.

Figure 6:
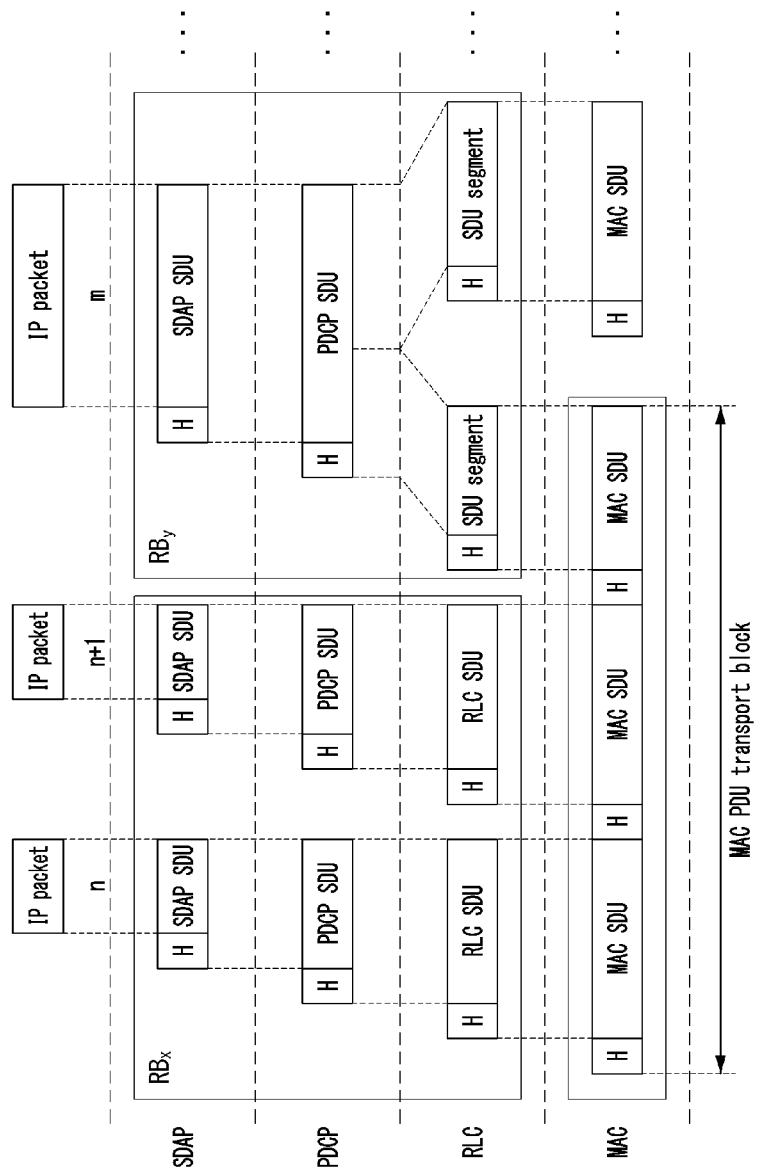
FIG. 6 is a conceptual diagram illustrating a first exemplary embodiment of a data flow in L2.

FIG. 6 is a conceptual diagram illustrating a first exemplary embodiment of a data flow in L2.

Referring to FIG. 6, in a transmitting device (i.e. RBx), each layer of L2 may generate a protocol data unit (PDU) by attaching a header to an input upper layer service data unit (SDU). Then, a MAC layer may configure a transport block (TB) with PDUs and deliver it to L1. In other words, an SDAP layer in the transmitting device RBx may generate a PDCP SDU by attaching an SDAP header to each of IP packets (i.e. SDAP SDUs). Then, a PDCP layer may generate an RLC SDU by attaching a PDCP header to each of the PDCP SDUs. In addition, an RLC layer may generate a MAC SDU by attaching an RLC header to each of the RLC SDUs. Then, the MAC layer may generate a MAC PDU by attaching a MAC header to each of the MAC SDUs. Then, the MAC layer may generate a transport block with a certain number of MAC PDUs and deliver it to L1.

On the other, in a receiving device (i.e. RBy), a MAC layer of L2 may generate a MAC PDU by decomposing a transport block received from L1, and then decompose the MAC PDU to generate MAC PDU segments. Subsequently, an RLC layer of L2 may generate PDCP PDU segments by removing a header from each of the MAC PDU segments received from the MAC layer, and deliver them to a PDCP layer. The PDCP layer may combine the PDCP PDU segments received from the RLC layer to generate a PDCP PDU, remove a header therefrom to generate an SDAP PDU, and deliver it to an SDAP layer. Accordingly, the SDAP layer may generate an SDAP SDU by removing a header from the SDAP PDU received from the PDCP layer, and deliver it to L3. In the above-described process, since each layer of L2 generates a PDU by attaching a header to each IP packet, overhead due to excessive headers may occur in large-capacity transmission.

Figure 7:
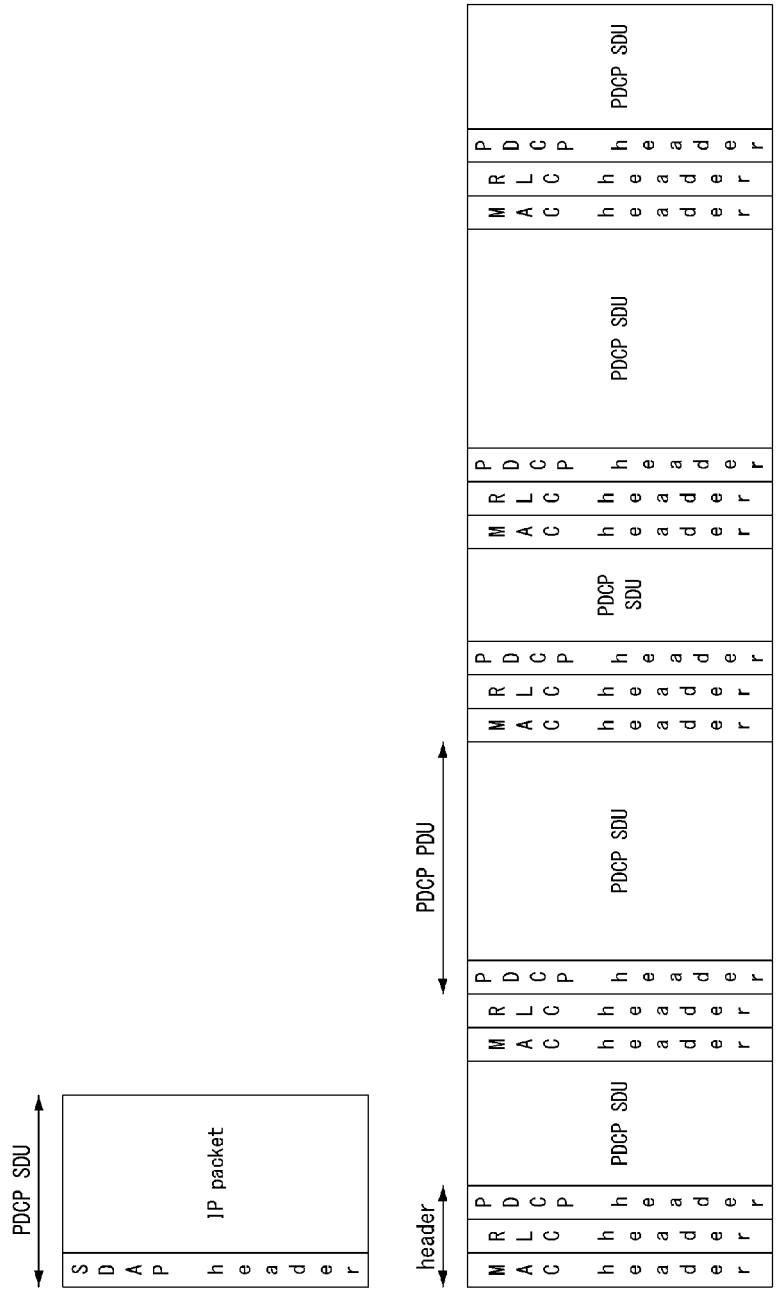
FIG. 7 is a conceptual diagram illustrating a first exemplary embodiment of a structure of a protocol data unit (PDU).

FIG. 7 is a conceptual diagram illustrating a first exemplary embodiment of a structure of a protocol data unit (PDU).

Referring to FIG. 7, a PDCP SDU may be formed by attaching an SDAP header to an IP packet (i.e. SDAP SDU). In addition, a PDCP PDU may be formed by attaching a PDCP header to the PDCP SDU. Here, the headers may include the MAC header, RLC header, or PDCP header.

Figure 8:
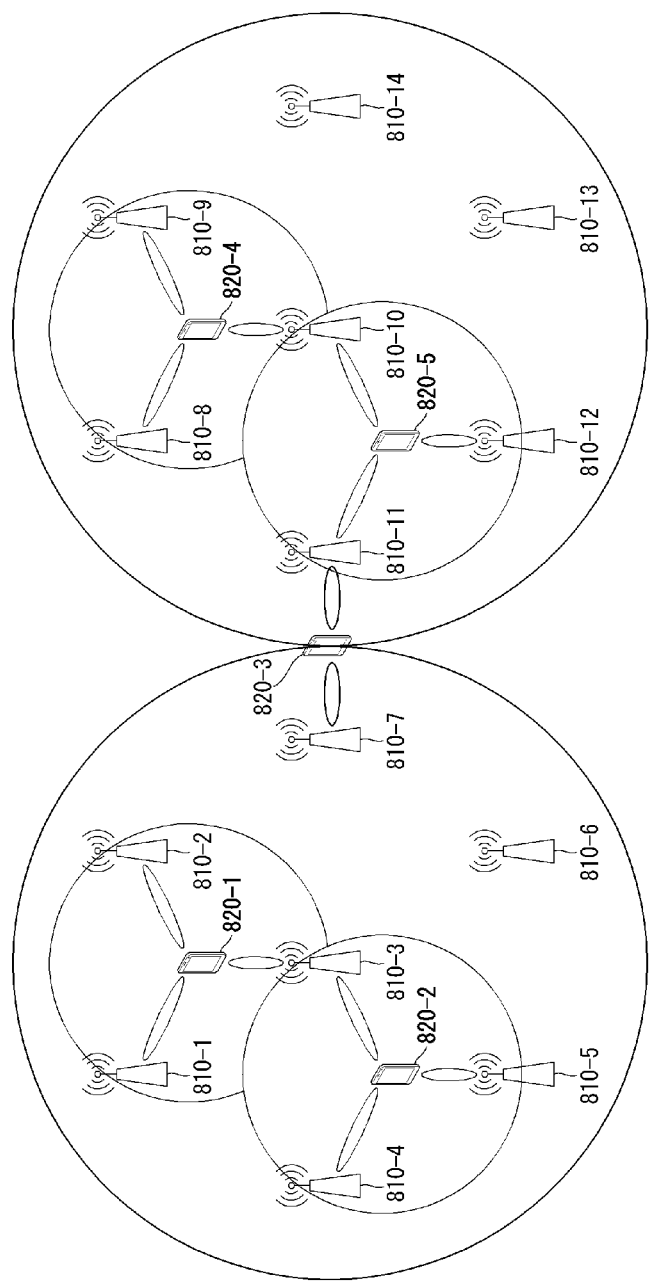
FIG. 8 is a conceptual diagram illustrating a first exemplary embodiment of a terminal-centric cell.

FIG. 8 is a conceptual diagram illustrating a first exemplary embodiment of a terminal-centric cell.

Referring to FIG. 8, a first radio access point 810-1 to a third radio access point 810-3 may form a terminal-centric cell, and provide services to a first terminal 820-1. In addition, the third radio access point 810-3 to a fifth radio access point 810-5 may form a terminal-centric cell, and provide services to a second terminal 820-2. In addition, an eighth radio access point 810-8 to a tenth radio access point 810-10 may form a terminal-centric cell and provide services to a fourth terminal 820-4. In addition, the tenth radio access point 810-10 to a twelfth radio access point 810-12 may form a terminal-centric cell and provide services to a fifth terminal 820-5. Meanwhile, a seventh radio access point 810-7 may provide services to a third terminal 820-3. Alternatively, the eleventh radio access point 810-11 may provide services to the third terminal 820-3.

As described above, one terminal-centric cell may include a plurality of radio access points that can be interconnected through a combination of ideal or non-ideal backhaul links. A fine-beam-based cell configuration scenario may not be limited to a cloud radio access network (CRAN) structure and ideal backhaul (implying virtually a zero delay for infinite backhaul data rates), but may be extended to cooperating radio access points under central control. The radio access points connected through non-ideal backhaul links within one terminal-centric cell may include several radio access protocol entities.

Meanwhile, an ultra-high frequency band can support a wide continuous bandwidth, increased radio wave directivity, and miniaturized antennas. On the other hand, since signal attenuation and loss are large and a radio wave reach distance is short in the ultra-high frequency band, radio wave interference/blocking by obstacles may occur severely. Therefore, the ultra-high frequency band may require support of multi-connectivity between base stations or between different radio access technologies (RATs) to provide service coverage, mobility, reliability, and availability. The multi-connectivity may mean that a terminal establishes and maintains multiple connections with various types of base stations or access points. The type of multi-connectivity may be classified into an intra-frequency multi-connectivity and an inter-frequency multi-connectivity based on frequencies applied to the system.

Figure 9:
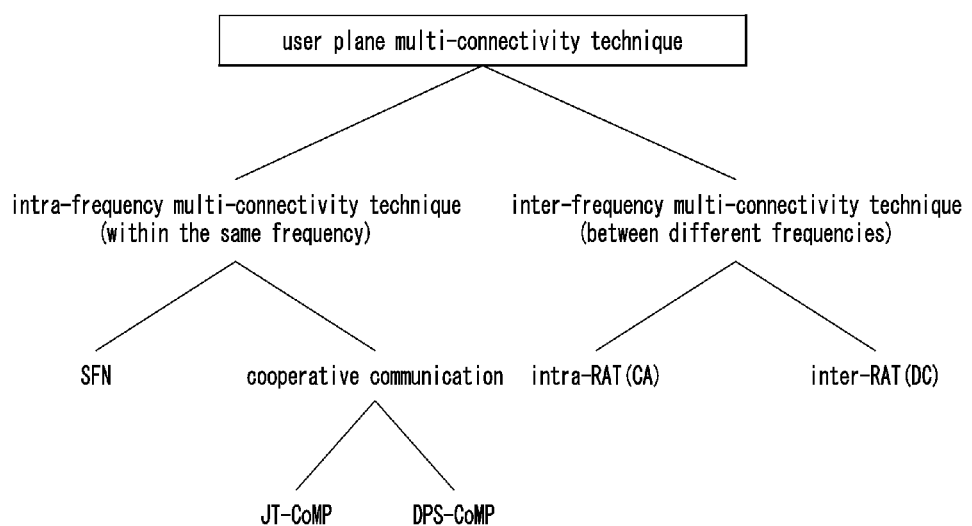
FIG. 9 is a conceptual diagram illustrating a first exemplary embodiment of configuration of a user plane multi-connectivity technique.

FIG. 9 is a conceptual diagram illustrating a first exemplary embodiment of configuration of a user plane multi-connectivity technique.

Referring to FIG. 9, an intra-frequency multi-connectivity technique among user plane multi-connectivity techniques may be a multi-connectivity technique within the same frequency range. The intra-frequency multi-connectivity technique may include single frequency network (SFN), cooperative communication, and the like. The intra-frequency multi-connectivity technique may require a common MAC layer to adjust a modulation and coding scheme (MCS), transmission resources, and transmission scheme in a scheduler. In addition, in the intra-frequency multi-connectivity technique, a transmission delay to each radio access point may be very small for synchronization between radio access points.

Specifically, the intra-frequency multi-connectivity techniques may include SFN, joint transmission CoMP (JT-COMP), dynamic point selection COMP (DPS COMP), and the like. Here, the SFN may synchronize signals transmitted by a plurality of base stations at the same frequency so that the terminal receives the signals within a cyclic prefix of an OFDM symbol. In case of broadcast/multicast transmission, the intra-frequency multi-connectivity technique allows the base station to transmit the same data using the same MCS and radio resources without channel information of terminals. In addition, according to the intra-frequency multi-connectivity technique, in case of transmission to a specific terminal, beam information may be received from the specific terminal, and the same data may be transmitted to the terminal using the same MCS and radio resources through a base station and a beam which are selected based on the beam information.

The terminal may overcome radio wave blocking/interference caused due to obstacles by receiving data by combining signals received from multiple base stations. In the JT-COMP, the terminal may measure a beam reference signal received from each base station and transmit information on a base station identifier (ID), beam ID, and channel state information, which are obtained by the measurement, to the base station. In the JT-COMP, weights between base stations may be calculated based thereof, and data may be transmitted using the same MCS and radio resources through base stations to which different weights are applied.

The JT-COMP can overcome service interruption due to radio wave blocking, and improve a quality of a received signal because it receives signals from another beam even if signals of one beam are blocked by obstacles. In the DPS-COMP, data may be transmitted by selecting a base station and a beam optimal for a terminal based on channel information for each base station and beam transmitted by the terminal. The DPS-COMP can support service continuity or mobility by quickly performing beam switching to another base station's beam when a serving beam is blocked by obstacles.

Since a communication system can support a wide frequency bandwidth in an ultra-high frequency band, the frequency band may be divided into multiple carrier frequencies, and multiple RATs may be configured by applying different numerologies according to service requirements. In addition, the communication system may configure a network using a 6 GHz or lower band RAT and an ultra-high frequency band RAT.

On the other hand, an inter-frequency multi-connectivity technique may be a multi-connectivity technique between different frequencies. The inter-frequency multi-connectivity techniques may include a carrier aggregation (CA) technique in an intra-RAT environment and a dual-connectivity (DC) technique in an inter-RAT environment. In the CA, data may be transmitted and received using two or more carrier frequencies. The ultra-high frequency band may utilize an available continuous frequency bandwidth. The CA may divide a wide frequency bandwidth into multiple carrier frequencies to configure RATs suitable for large-capacity traffic transmission and various service types. The DC has been proposed to improve the performance of small cells, and may have the features of simultaneously transmitting data from a macro cell eNB and a small cell eNB connected by a non-ideal backhaul link through an X2 interface.

The convergence of connections with two cells may be possible at a serving gateway (S-GW) or PDCP layer. Multiple RAT connections may be aggregated at the PDCP layer. A user plane controller of the PDCP layer may perform storage, distribution, and coordination of data between base stations. Additionally, the user plane controller of the PDCP layer may ensure sequential transmission of received data packets. When transmitting data simultaneously through different RATs, the user plane controller of the PDCP layer may control the traffic amount by considering transmission bandwidths and transmission delays of the respective RATs to prevent delays in processing sequential data transmission of the PDCP layer.

Meanwhile, network softwarization may be a very important technology in network evolution, and a common physical network infrastructure may be divided into hardware and software. In addition, the network softwarization may enable various logical or virtual network configurations depending on service scenarios and business models through software-defined networking (SDN) and network function virtualization (NFV) technologies.

The logical or virtual network may be defined as a network slice. The network slice may satisfy various service-based requirements, mainly depending on business needs. The network slice has been mainly proposed for a 5G core network, and may dynamically configure a virtualized core network according to business purposes by using the SDN and NFV technologies. The 5G RAN may be designed to distribute functions and resources appropriate for the characteristics of each slice, thereby enabling configuration of network slices for various purposes.

When designing the RAN considering the impacts and supports of network slices, multiple network slices may be configured according to service or business scenarios to meet necessary requirements and maximize resource utilization. Rather than being configured with a separate physical network, the respective network slices may be configured as logical networks within the same physical network infrastructure. The RAN may support efficient use of radio resources, transmission links, and infrastructure resources between multiple network slices. For example, it may be efficient to statically allocate independent radio resources to a network slice that does not change significantly in a data rate and requires low latency and ultra-reliability.

On the other hand, if the RAN allocates dedicated resources to network slices with rapidly changing traffic patterns, resource utilization may be low or data loss may occur. The RAN may allocate shared resources to these network slices and can increase resource utilization by allocating resources through a scheduling mechanism. Therefore, when designing network slices, the RAN may need to consider a resource allocation algorithm suitable for the traffic requirements of the slices.

In terms of network slice identification, the current 3GPP core network may support a quality of service (QOS) mechanism. It may be necessary to examine whether the mechanism is applicable to all network slices without network slice identification in the RAN. For example, the RAN may require priority information for each network slice when scheduling shared radio resources. To support this, network slice identifier information may be required in the RAN. The RAN may require a mechanism for distinguishing traffic types and a mechanism for applying priorities to the traffic types of the network slice. The RAN's scheduler may determine whether additional functions are required to allocate resources by distinguishing the priorities of inter-slice and intra-slice traffic flows. When multiple network slices supporting a protection mechanism share radio resources, it may be required to minimize the impact between slices. The protection mechanism between slices may be designed so that when traffic congestion occurs in one network slice, it does not affect other network slices.

In terms of infrastructure management support, interfaces for infrastructure management mechanisms may be designed to support the RAN to generate, modify, and delete slices to suit network slice requirements such as mobility, traffic patterns, delay, and jitter.

Figure 10:
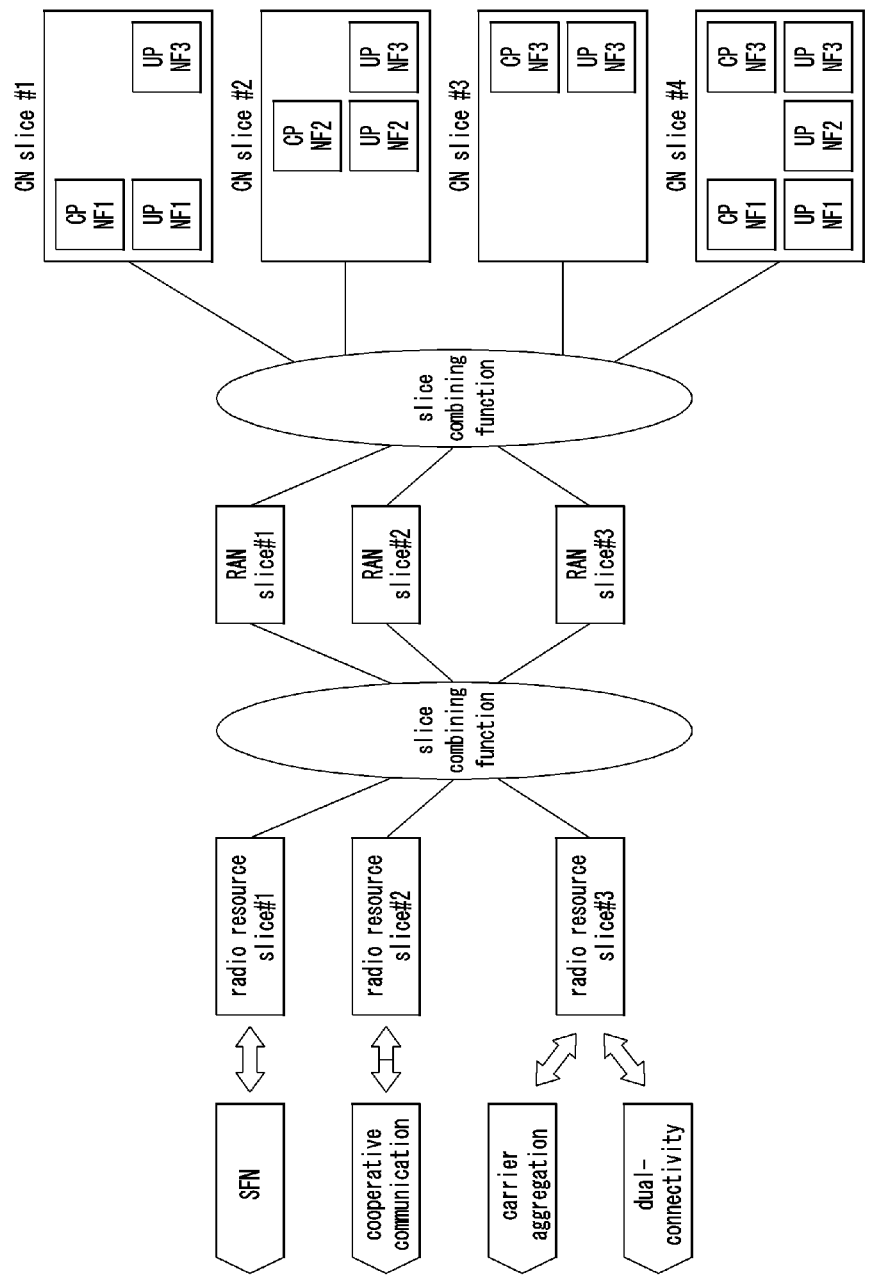
FIG. 10 is a conceptual diagram illustrating a first exemplary embodiment of functional configuration according to network softwarization.

FIG. 10 is a conceptual diagram illustrating a first exemplary embodiment of functional configuration according to network softwarization.

Referring to FIG. 10, core network (CN) slices #1 to #4 may each include at least one control plane (CP) network function (NF) and at least one user plane (UP) NF. The CN slices #1 to #4 may be connected to a slice combining function. In addition, RAN slices #1 to #3 may be connected to a slice combining function on one side and may be connected to a slice combining function on the other side. Then, radio resource slices #1 to 3 may be connected to a slice combining function on one side. The radio resource slice #1 may support SFN, the radio resource slice #2 may support cooperative communication, and the radio resource slice #3 may support carrier aggregation and dual-connectivity.

Meanwhile, the ultra-high frequency-based mobile communication system may use beam-based antenna patterns. The beam-based antenna pattern may cause dynamic changes in service coverage, signal quality, and channel quality when a beam directivity changes due to a small movement or rotation of the terminal. In addition, signal blocking due to obstacles may easily occur, which may greatly reduce a beam service coverage and cause frequent handovers to beams of other base stations. As a method to overcome this, the ultra-high frequency-based mobile communication system may use base station clustering, which may not affect the core network and can support mobility of the terminal.

Figure 11:
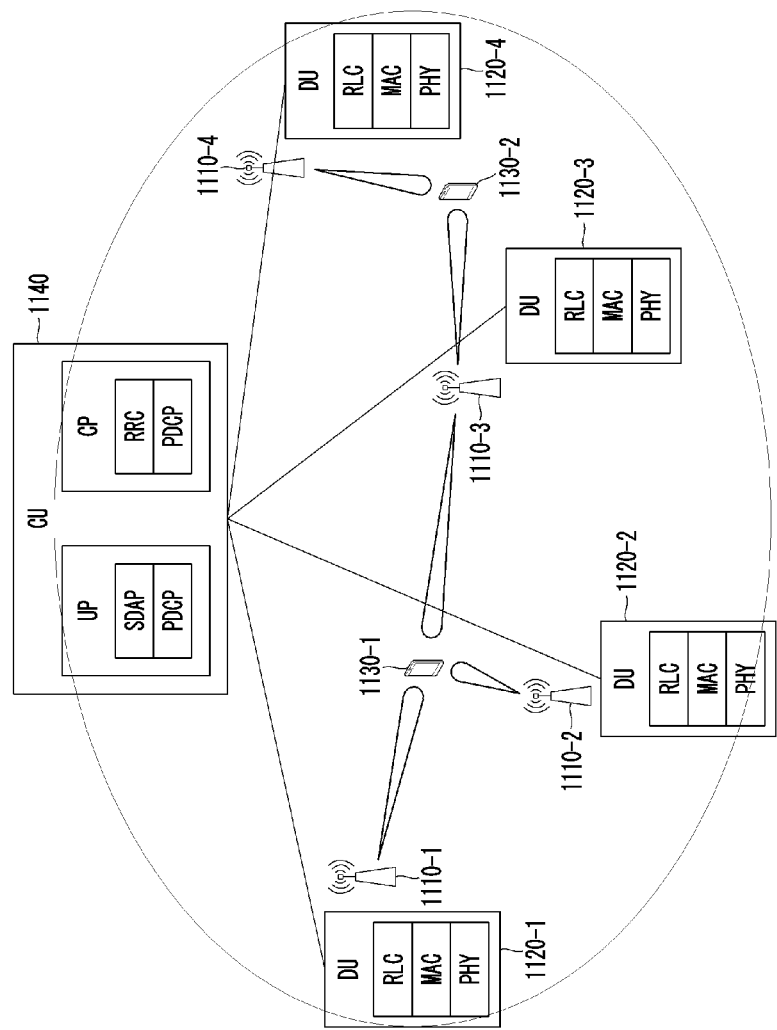
FIG. 11 is a conceptual diagram illustrating a second exemplary embodiment of a terminal-centric cluster configured based on a functional split-applied base station.

FIG. 11 is a conceptual diagram illustrating a second exemplary embodiment of a terminal-centric cluster configured based on a functional split-applied base station.

Referring to FIG. 11, a first radio access point 1110-1 associated with a first DU 1120-1, a second radio access point 1110-2 associated with a second DU 1120-2, and a third radio access point 1110-3 associated with a third DU 1120-3 may form a base station cluster and provide services to a first terminal 1130-1. In addition, the third radio access point 1110-3 associated with the third DU 1120-3 and a fourth radio access point 1110-4 associated with a fourth DU 1120-4 may also form a base station cluster and provide services to a second terminal 1130-2. Here, the first to fourth DUs may be connected to a CU 1140. The CU may include SDAP and PDCP layers in a user plane (UP), and RRC and PDCP layers in a control plane (CP). Each of the first to fourth DUs may be equipped with RLC, MAC, and PHY layers.

In such the terminal-centric cluster, an inter-node or inter-beam handover due to movement of the terminal or obstruction of propagation by obstacles may be performed within the terminal-centric cluster without core network signaling. As described above, the terminal-centric cluster may be a group of base stations that can provide services to the terminal. The terminal-centric cluster may be configured based on a location of each terminal.

The radio access point may be added to or deleted from the terminal-centric cluster according to movement of the terminal. A certain radio access point may be designated as a reference radio access point to control beam switching within a radio access point or beam handover between radio access points according to a movement of the terminal within the terminal-centric cluster. The reference radio access point may establish connections with the core network and all radio access points within the cluster. Methods of configuring a terminal-centric cluster may be classified into various functional split-based clustering methods depending on a quality and capacity of transmission links to the radio access points.

When using transmission links with a limited bandwidth, a terminal-centric cluster may be configured through clustering based on upper layer functional split. In this case, the CU may handle a protocol stack that is less sensitive to latency. The DUs may process up to a delay-sensitive L2 layer and perform resource allocation and beamforming functions. The upper layer functional split-based clustering method may be classified into a distributed mode and a centralized mode. In the distributed mode, the reference radio access point may be selected from among radio access points constituting the cluster. When beam switching occurs to a radio access point other than radio access points for which the reference radio access point is responsible, the reference radio access point may perform data forwarding to the corresponding radio access point. The data forwarding may be performed at the RLC layer or MAC layer. In the centralized mode, the reference radio access point may be selected among the DUs. The radio access points constituting the terminal-centric cluster may receive data from the CU. The CU may transmit data processed in the PDCP layer to the radio access point to which a serving beam for the terminal belongs.

Figure 12:
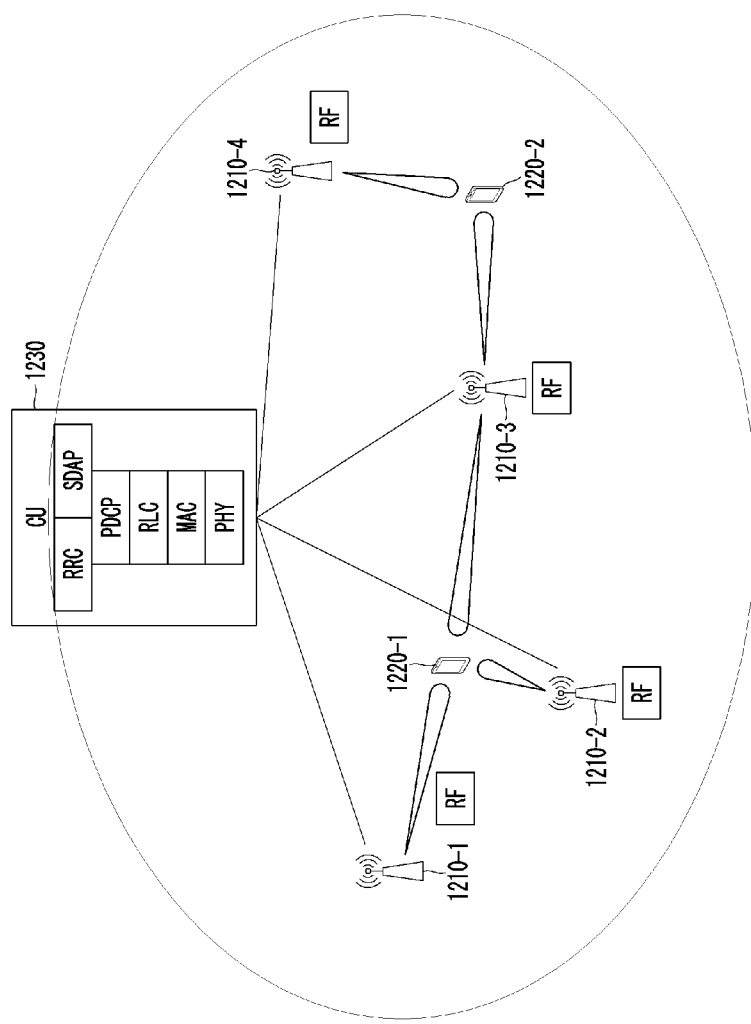
FIG. 12 is a conceptual diagram illustrating a first exemplary embodiment of a terminal-centric cluster configured based on radio access points.

FIG. 12 is a conceptual diagram illustrating a first exemplary embodiment of a terminal-centric cluster configured based on radio access points.

Referring to FIG. 12, a first radio access point 1210-1, a second radio access point 1210-2, and a third radio access point 1210-3 may form a terminal-centric cluster and provide services to a first terminal 1220-1. In addition, the third radio access point 1210-3 and a fourth radio access point 1210-4 may also form a terminal-centric cluster and provide services to a second terminal 1220-2.

In the radio access point-based terminal-centric clustering, a base station may be split into a CU 1230 and RU(s). The CU 1230 may process all control plane and user plane protocol functions. In other words, the CU 1230 may include RRC, SDAP, PDCP, RLC, MAC, and PHY layers. The radio access points 1210-1 to 1210-4 may perform RU functions and process RF functions like remote radio head (RRH). The terminals 1220-1 and 1220-2 may measure beam reference signals and transmit a list of optimal radio access points and beam information to the CU 1230. Then, the CU 1230 may determine the radio access points 1210-1 to 1210-4 and beams to provide services to the terminals 1220-1 and 1220-2.

The radio access points 1210-1 to 1210-4 may perform analog beamforming, and in this case, information on weights between beams may be received from the CU 1230. The CU 1230 may perform fast beam switching to other serviceable radio access points when signal attenuation of the terminals 1220-1 and 1220-2 occurs or radio waves are blocked by obstacles. To this end, the reference radio access point may track and manage the radio access points and beams that are available for the terminals 1220-1 and 1220-2.

A central control station may add/delete the radio access points constituting the respective clusters according to movements of the terminals 1220-1 and 1220-2. The terminals 1220-1 and 1220-2 may measure a signal quality of each beam by receiving common reference signals and beam reference signals, and perform measurement reporting periodically or according to events. The reference radio access point may change the reference radio access point or may add or delete the radio access points based on the measurement reporting.

Mobility support within the cluster may be performed based on beam switching. Based on the measurement reports transmitted from the terminals 1220-1 and 1220-2, the reference radio access point may determine intra-beam switching and inter-beam switching. The intra-beam switching may be performed within a cluster comprised of the CU 1230. A scheduler may quickly perform beam switching to an adjacent beam according to information on the measured signal quality(ies) or when interference due to obstacles occurs in a serving beam. The radio access points 1210-1 to 1210-4 receiving the measurement reports from the terminals 1220-1 and 1220-2 may transmit information on the measurement reports to the reference radio access point when inter-beam switching is required. The reference radio access point may request beam switching from a target radio access point, and upon receipt of a response thereto, the reference radio access point may notify a serving radio access point of the beam switching. Accordingly, the terminals 1220-1 and 1220-2 may switch to a target beam and receive data from the target radio access point.

Figure 13:
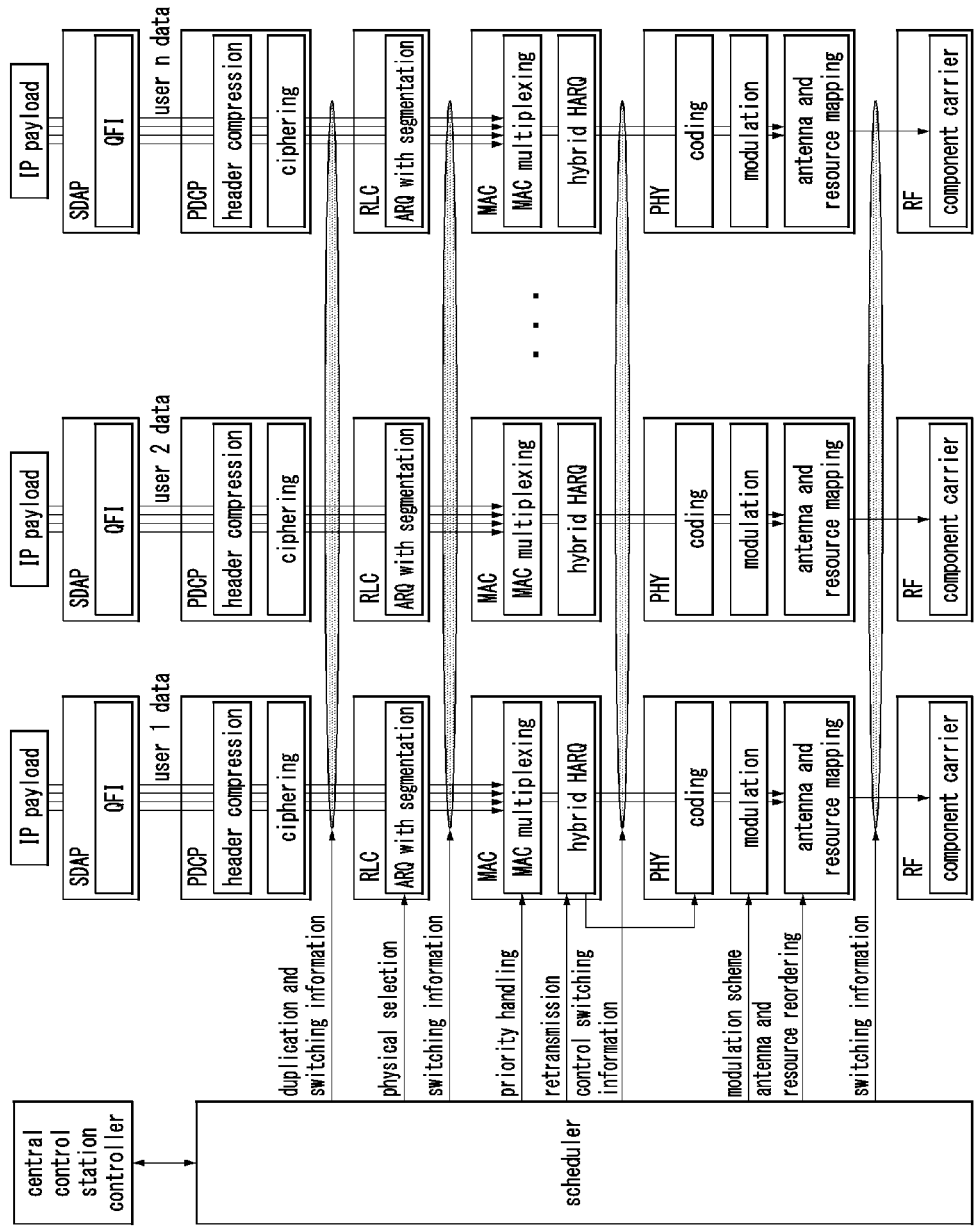
FIG. 13 is a conceptual diagram illustrating a first exemplary embodiment of a radio protocol of a terminal-centric cluster configured based on a functional split-applied base station.

FIG. 13 is a conceptual diagram illustrating a first exemplary embodiment of a radio protocol of a terminal-centric cluster configured based on a functional split-applied base station.

Referring to FIG. 13, a controller of a central control station may configure a flexible radio protocol through switch functions on a base station functional split structure. A protocol entity of each layer may flexibly select radio access points to form a terminal-centric cluster according to a multi-connectivity function performed in a state where functional split is applied.

Figure 14A:
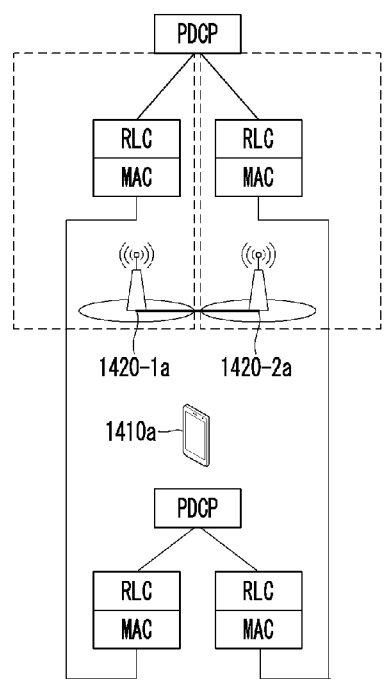
FIGS. 14A and 14B are conceptual diagrams illustrating a first exemplary embodiment of a data plane of a terminal-centric cluster configured based on radio access points.
Figure 14B:
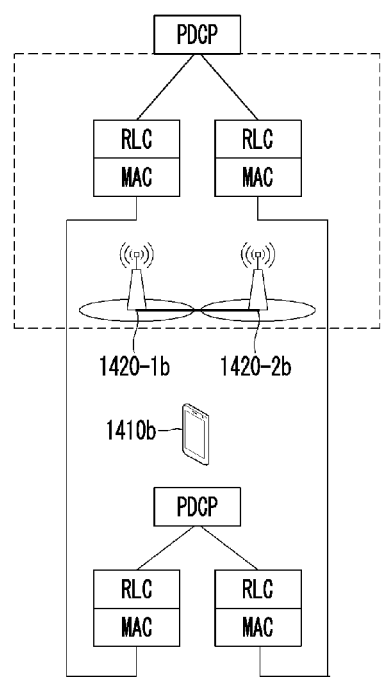

FIGS. 14A and 14B are conceptual diagrams illustrating a first exemplary embodiment of a data plane of a terminal-centric cluster configured based on radio access points.

Referring to FIG. 14A, in a data plane of a terminal-centric cluster configured based on radio access points, a terminal 1410a may be simultaneously connected to a plurality of radio access points 1420-1a and 1420-2a. The terminal 1410a may simultaneously receive multiple independently scheduled data streams from the plurality of radio access points 1420-1a and 1420-2a. In this case, each of the plurality of radio access points 1420-1a and 1420-2a may include an RLC protocol and a MAC protocol.

Referring to FIG. 14B, in a data plane of a terminal-centric cluster configured based on radio access points, a terminal 1410b may be simultaneously connected to a plurality of radio access points 1420-1b and 1420-2b. The terminal 1410b may simultaneously receive multiple independently scheduled data streams from the plurality of radio access points 1420-1b and 1420-2b. In this case, each of the plurality of radio access points 1420-1b and 1420-2b may perform an RF function. An RLC protocol and a MAC protocol for each of the plurality of radio access points 1420-1b and 1420-2b may be included in a central control station.

The terminal-centric cluster may be useful even in an ideal backhaul scenario where centralized scheduling is possible and multiple control channels can be transmitted from different radio access points 1420-1b and 1420-2b. As described above, the clusters in FIGS. 14A and 14B may be configured with a set of radio access points connected to a single CU. Also, multiple base stations may form a single cluster, so that a multi-connectivity technique can be applied across multiple CUs.

Figure 15:
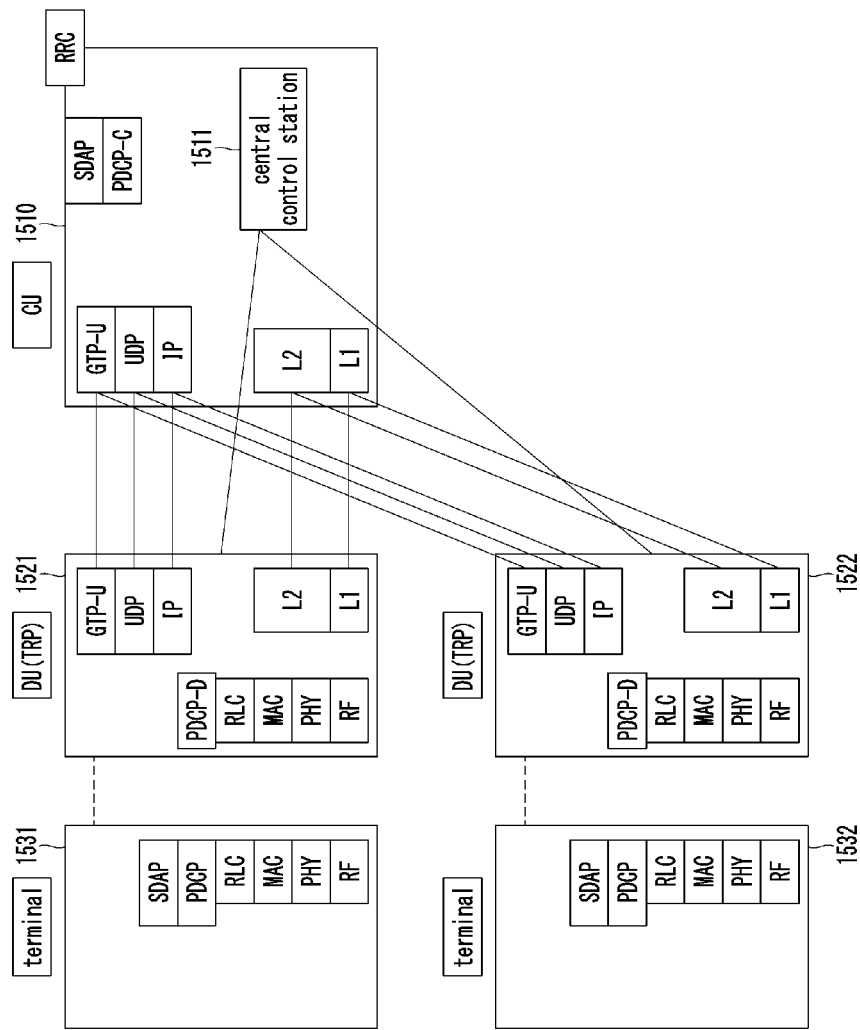
FIG. 15 is a conceptual diagram illustrating a first exemplary embodiment of a large-capacity data transmission protocol for a multi-PDCP-based cluster.

FIG. 15 is a conceptual diagram illustrating a first exemplary embodiment of a large-capacity data transmission protocol for a multi-PDCP-based cluster.

Referring to FIG. 15, a central control station 1511 may perform signal processing and synchronization functions for generation of data paths and control of protocols of functional split-applied base stations 1521 and 1522. The central control station 1511 may exist within a CU 1510. Alternatively, the central control station 1511 may exist independently. The central control station 1511 may generate paths for cluster management and data transmission of a set of functionally-split CU 1510, DUs 1521 and 1522, and RUs, and manage mapping and switching of the respective protocol entities.

In addition, the central control station 1511 may supervise signal processing for terminals 1531 and 1532 through connected paths, and may perform a synchronization function for data transmission by the applied multi-connectivity technique. The data may be transmitted as being duplicated to ensure data transmission and data integrity through flexible multiple paths to which the multi-connectivity technique is applied. To this end, a PDCP may perform data integrity functions as being split into a PDCP-central (PDCP-C) and a PDCP-distributed (PDCP-D).

Figure 16:
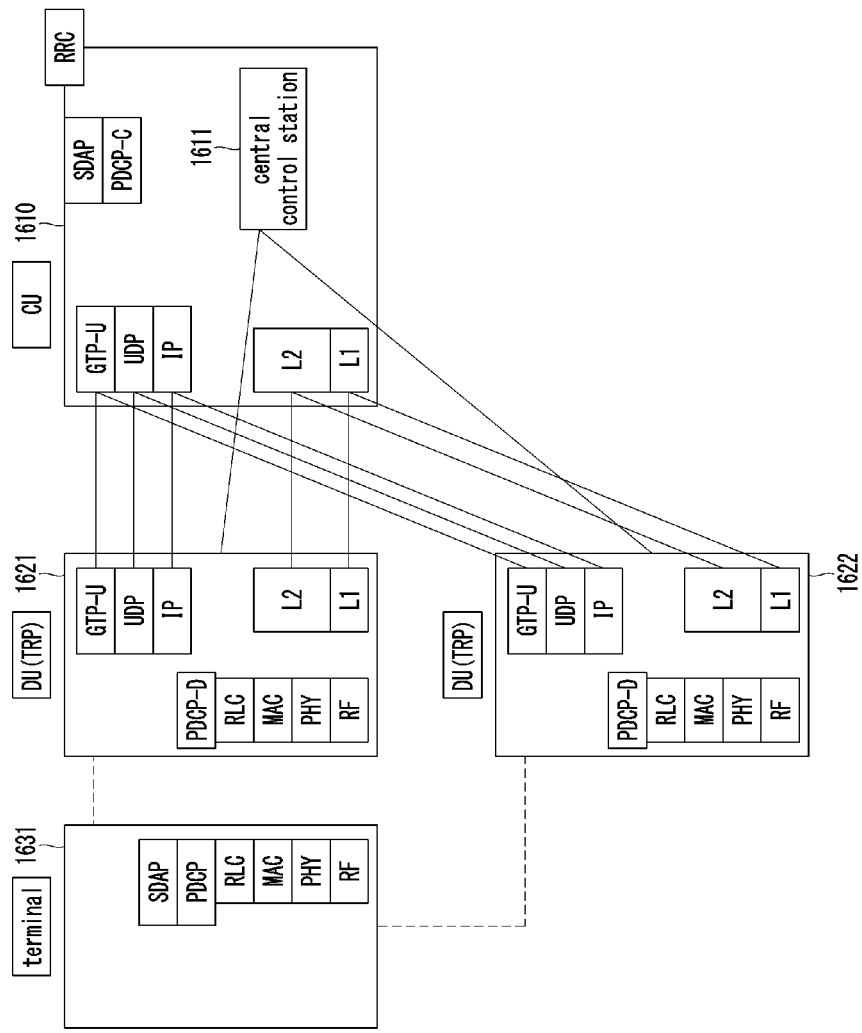
FIG. 16 is a conceptual diagram illustrating a second exemplary embodiment of a large-capacity data transmission protocol for a multi-PDCP-based cluster.

FIG. 16 is a conceptual diagram illustrating a second exemplary embodiment of a large-capacity data transmission protocol for a multi-PDCP-based cluster.

Referring to FIG. 16, a central control station 1611 may perform signal processing and synchronization functions for generation of data paths and control of protocols of functional split-applied base stations 1621 and 1622. The central control station 1611 may exist within a CU 1610. Alternatively, the central control station 1611 may exist independently. The central control station 1611 may generate paths for cluster management and data transmission of a set of functionally-split CU 1610, DUs 1621 and 1522, and RUs, and manage mapping and switching of the respective protocol entities.

In addition, the central control station 1611 may supervise signal processing for a terminal 1631 through connected paths, and may perform a synchronization function for data transmission by the applied multi-connectivity technique. The data may be transmitted as being duplicated to ensure data transmission and data integrity through flexible multiple paths to which the multi-connectivity technique is applied. To this end, a PDCP may perform data integrity functions as being split into a PDCP-C and a PDCP-D.

Meanwhile, the multi-PDCP-based cluster may require data management according to the applied multi-connectivity technique to ensure data integrity in a multi-connectivity environment. In addition, duplicate data transmission and reordering and sequencing of received data may be required for radio access points of the multi-PDCP-based cluster.

Figure 17A:
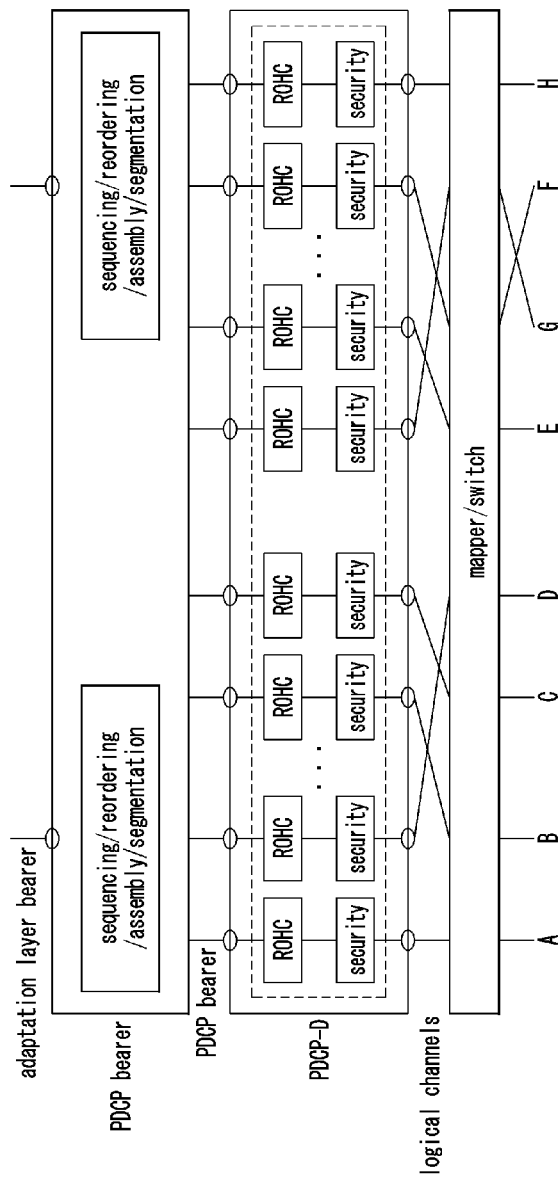
FIGS. 17A and 17B are a conceptual diagram illustrating a first exemplary embodiment of a large-capacity data integrity ensuring structure for a multi-PDCP-based cluster.
Figure 17B:
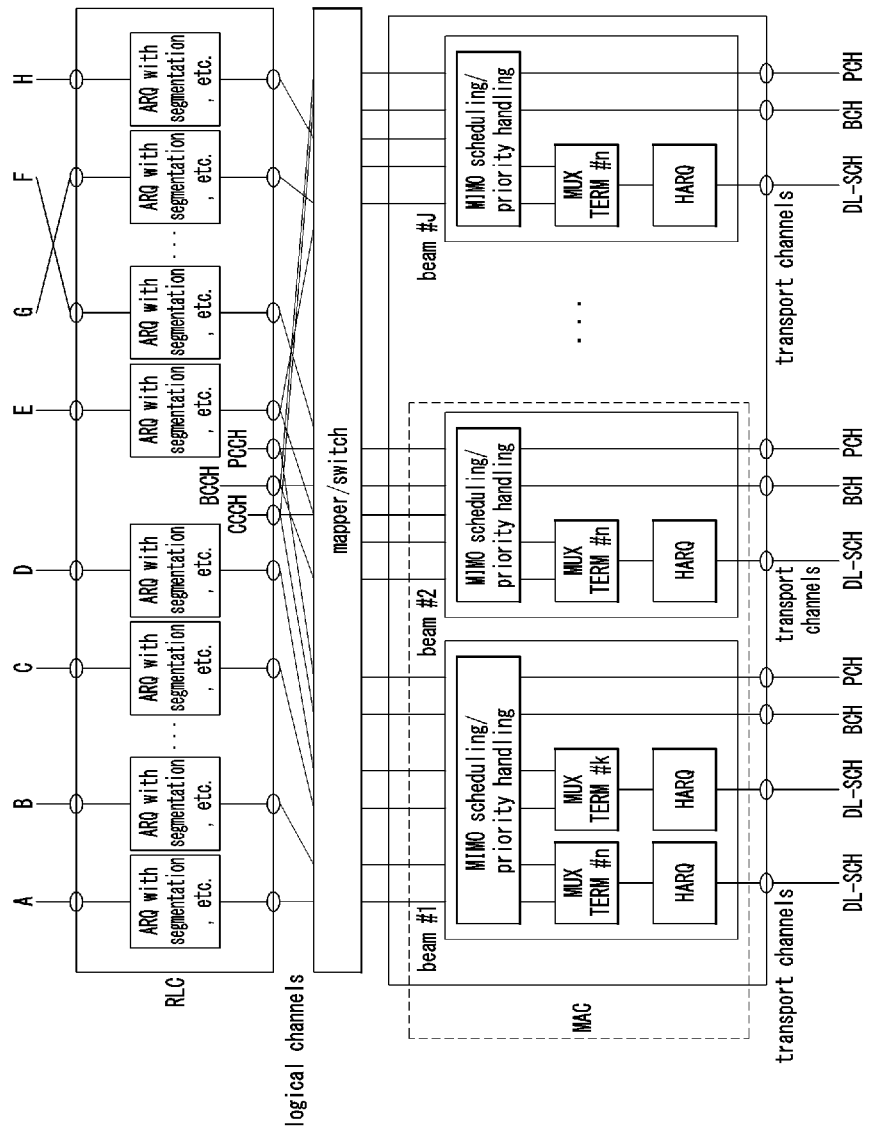

FIGS. 17A and 17B are a conceptual diagram illustrating a first exemplary embodiment of a large-capacity data integrity ensuring structure for a multi-PDCP-based cluster.

Referring to FIGS. 17A and 17B, an L2 layer may transmit data through a plurality of functionally-split radio access points. As a result, protocol entities for the respective layers may be flexibly joined. Accordingly, the L2 layer may require flexible bearer and channel management. In this case, retransmission for data integrity may be performed on a cluster basis according to indication of the central control station. To this end, the L2 layer may manage logical channel information in each entity and deliver information on PDU(s) according to the logical channel information.

Figure 18:
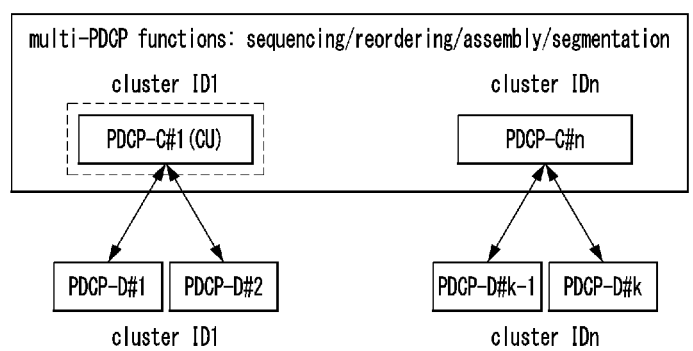
FIG. 18 is a block diagram illustrating a first exemplary embodiment of a multi-PDCP structure.

FIG. 18 is a block diagram illustrating a first exemplary embodiment of a multi-PDCP structure.

Referring to FIG. 18, PDCP-C entities (e.g. PDCP-C #1 to PDCP-C #n) located in a CU may connected to plurality of PDCP-D entities (e.g. PDCP-D #1 to PDCP-D #k) located in DUS, and may be redundantly cross-connected. The PDCP-D entities (e.g. PDCP-D #1 to PDCP-D #k) may only perform a function of controlling individual IP data among functions of the PDCP layer. The PDCP-C entities (e.g. PDCP-C #1 to PDCP-C #n) may perform reordering, sequencing, combining, and splitting of controlled IP packets. The PDCP-C entities (e.g. PDCP-C #1 to PDCP-C #n) may reduce L2 header overhead through IP data combining of the PDCP layer. Here, n and k may be positive integers. In this case, a PDCP group may be identified by a cluster ID. For instance, the PDCP-C #1, PDCP-D #1, and PDCP-D #2 may be identified by a cluster ID 1, and the PDCP-C #n, PDCP-D #k-1, and PDCP-D #k may be identified by a cluster ID n. When a cluster is reconfigured, branching to PDCP-C entity(ies) may be performed through a cluster ID configured based on information on a combination of CU-DU, so that L2 header overhead can be reduced through IP data combining in the PDCP layer.

Figure 19:
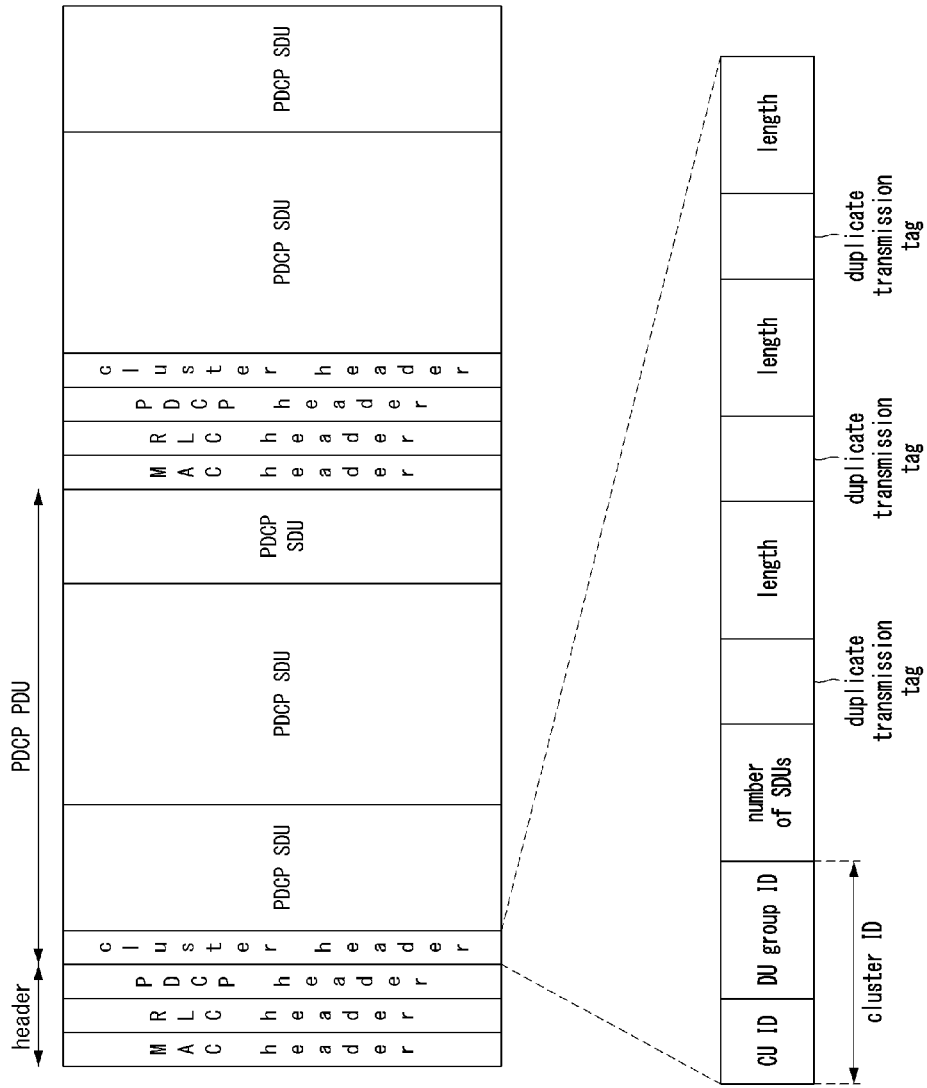
FIG. 19 is a structural diagram illustrating a first exemplary embodiment of a multi-PDCP-based PDU.

FIG. 19 is a structural diagram illustrating a first exemplary embodiment of a multi-PDCP-based PDU.

Referring to FIG. 19, a multi-PDCP-based PDCP PDU may include a plurality of PDCP SDUs and may include a cluster header. Here, the cluster header may include information on IP packets of the plurality of PDCP SDUs. As an example, the cluster header may include a CU ID, DU group ID, number of SDUs, duplicate tags, and lengths. Here, the CU ID and the DU group ID may form a cluster ID.

Based on the above-described configuration, in order to reduce the header overhead of the L2 layer, the PDCP-C layer may configure one PDCP SDU by concatenating IP packets with the same QoS flow. The cluster header may be configured with the cluster ID and information on the included PDCP SDUs. The PDCP PDU may be branched to the PDCP-C through the cluster ID configured with the CU ID and one or more DU group IDs constituting the cluster. Through this, the PDCP-C layer may increase transmission capacity during large-capacity transmission by reducing the L2 header overhead caused by configuring a header in each IP packet.

Figure 20A:
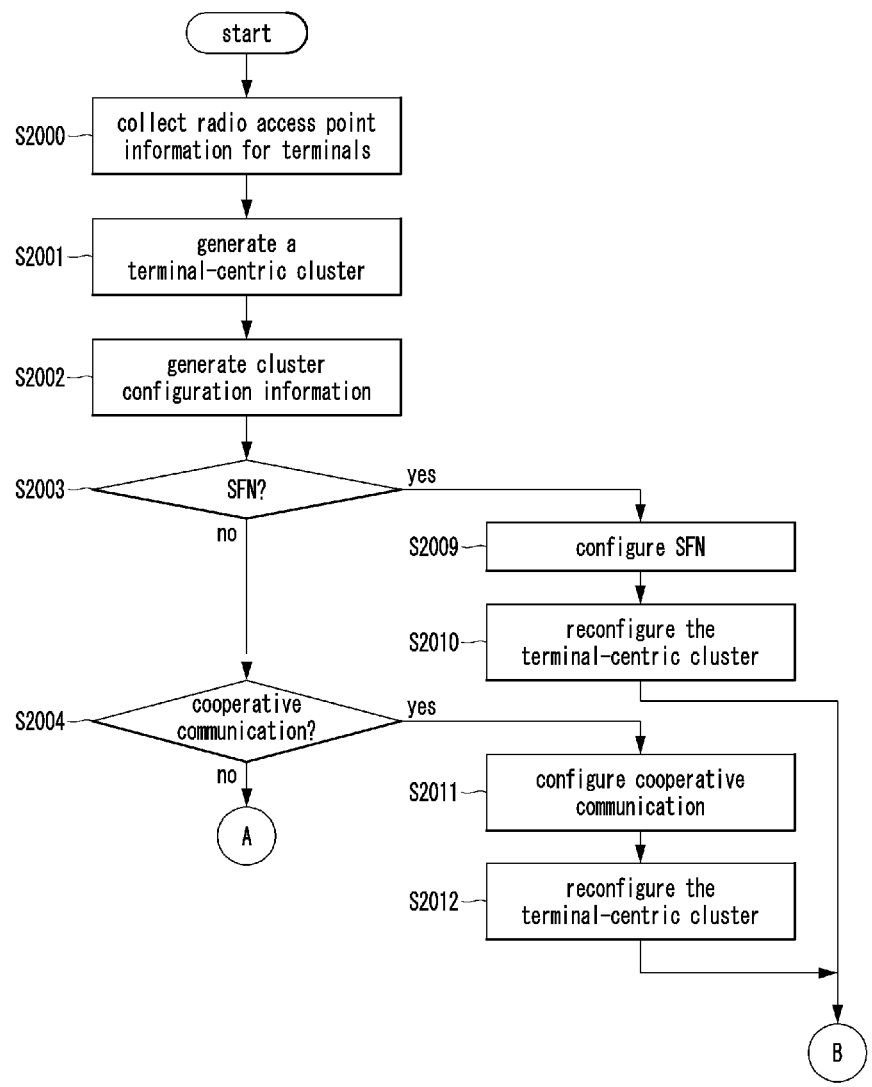

FIGS. 20A and 20B are a flowchart illustrating a first exemplary embodiment of a data transmission method for a high-capacity transmission network.

Referring to FIGS. 20A and 20B, in a data transmission method for a high-capacity transmission network, terminals may measure channel reception strengths, channel qualities, transmission delays, and/or the like for surrounding radio access points. The terminals may transmit radio access point information, including the channel reception strengths, channel qualities, and transmission delays measured for the respective radio access points, to a central control station. In this case, the terminals may distinguish the radio access points using identifiers and transmit the information on the channel reception strengths, channel qualities, transmission delays, and/or the like for the radio access points to the central control station. Then, the central control station may receive the radio access point information from the terminals and collect the radio access point information (S2000). Accordingly, the central control station may identify the identifiers for the radio access points around the terminals, and may identify the channel reception strength, channel quality, transmission delay, and/or the like for each radio access point.

Thereafter, the central control station may form a terminal-centric cluster with radio access points having a channel reception strength equal to or greater than a threshold for each terminal (S2001). In this case, the central control station may generate and assign a cluster ID to the terminal-centric cluster. In addition, the central control station may collect information on radio access points constituting the terminal-centric cluster, and generate cluster configuration information (S2002). Here, the cluster configuration information may include information on identifiers, channel reception strengths, channel qualities, and transmission delays of the radio access points constituting the terminal-centric cluster. Additionally, the cluster configuration information may include information on a frequency range used by each radio access point. Accordingly, the central control station may determine whether SFN is applicable by reconfiguring the terminal-centric cluster with radio access points using the same frequency range (S2003).

As a result of the determination, if SFN is applicable because there are no obstacles between the radio access points using the same frequency band and the terminal and thus a possibility that multiple paths are generated is low, the central control station may configure SFN by coordinating configuration information of the corresponding radio access points in order to apply SFN (S2009). Then, the central control station may reconfigure the terminal-centric cluster with the radio access points participating in SFN and DUs connected to the corresponding radio access points (S2010). Then, the central control station may establish a radio bearer for the terminal (S2017), generate a control message informing information on the radio access points participating in SFN, and transmit it to the terminal through the established radio bearer (S2018). Accordingly, the terminal may prepare to apply SFN by receiving information on the radio access points participating in SFN through the established radio bearer. Meanwhile, after transmitting the control message to the terminal, the central control station may update the existing terminal-centric cluster to the new terminal-centric cluster at a certain point in time, and provide communication services to the terminal using the updated terminal-centric cluster (S2019).

On the other hand, as the result of the determination, if SFN is not applicable because there are obstacles between the radio access points using the same frequency band and the terminal and thus a possibility that multiple paths are generated is high, the central control station may determine whether cooperative communication is applicable (S2004). If the cooperative communication is applicable as a result of the determination, the central control station may configure cooperative communication by coordinating the configuration information of the corresponding radio access points to apply the JT-COMP or DPS-COMP technique (S2011).

Then, the central control station may reconfigure the terminal-centric cluster with the radio access points participating in the cooperative communication (S2012). Then, the central control station may establish a radio bearer for the terminal (S2017), generate a control message informing information on the radio access points participating in the cooperative communication, and transmit it to the terminal through the established radio bearer (S2018). Accordingly, the terminal may prepare to apply the cooperative communication by receiving information on the radio access points participating in the cooperative communication through the established radio bearer. Meanwhile, after transmitting the control message to the terminal, the central control station may update the existing terminal-centric cluster to the new terminal-centric cluster at a certain point in time, and provide communication services to the terminal using the updated terminal-centric cluster (S2019).

On the other hand, as a result of the determination of the step S2004, if it is difficult to apply SFN and cooperative communication because there are not enough radio access points with the same frequency range, the central control station may determine whether frequency aggregation (e.g. CA) is possible using radio access points using heterogeneous frequencies (S2005).

As a result of the determination, if frequency aggregation is possible, the central control station may configure frequency aggregation by coordinating the configuration information of the corresponding radio access points to apply the frequency aggregation (S2013). Then, the central control station may reconfigure the terminal-centric cluster with radio access points participating in the frequency aggregation (S2014). Then, the central control station may determine whether DC is possible using the radio access points to be used for frequency aggregation (S2006). If frequency aggregation is not applicable according to the result of the determination of the step S2005, the central control station may perform the step S2006.

When dual-connectivity is applicable as a result of the determination, the central control station may configure dual-connectivity by coordinating the configuration information of the corresponding radio access points in order to apply the dual-connectivity (S2015). Then, the central control station may reconfigure the terminal-centric cluster with the radio access points participating in the dual-connectivity (S2016). Then, the central control station may establish a radio bearer for the terminal (S2017), generate a control message informing information on the radio access points participating in the dual-connectivity, and transmit it to the terminal through the established radio bearer (S2018). Accordingly, the terminal may prepare to apply the dual-connectivity by receiving information on the radio access points participating in the cooperative communication through the established radio bearer. Meanwhile, after transmitting the control message to the terminal, the central control station may update the existing terminal-centric cluster to the new terminal-centric cluster at a certain point in time, and provide communication services to the terminal using the updated terminal-centric cluster (S2019).

On the other hand, if it is difficult to apply dual-connectivity as the result of the determination in the step S2006, the central control station may determine a transmission priority of each radio access point according to the channel quality reported for each radio access point within the cluster (S2007). In addition, the central control station may allow the corresponding radio access points to transmit data to the terminal (S2008) by performing data scheduling according to the transmission priorities of the respective radio access points within the cluster.

Figure 21A:
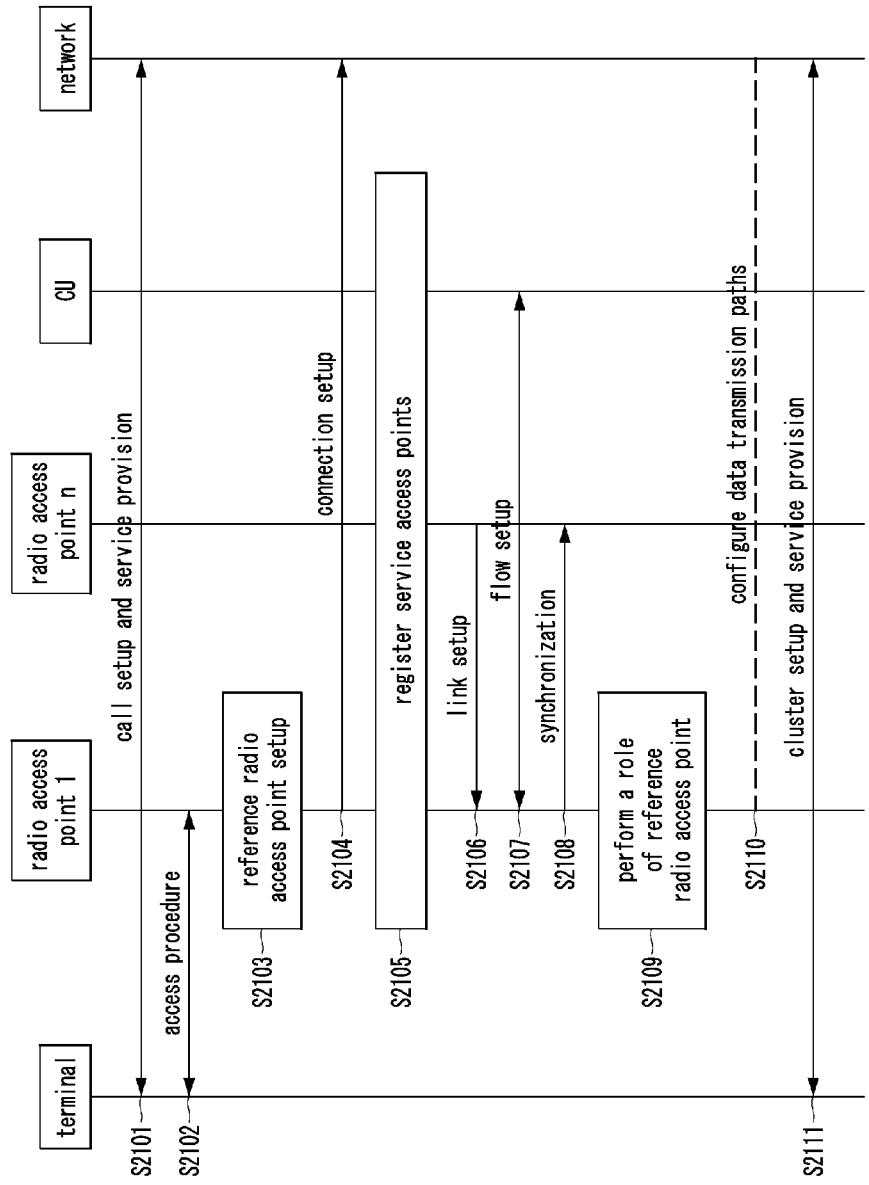
FIGS. 21A and 21B are a sequence chart illustrating a first exemplary embodiment of a terminal-centric cluster configuration method.
Figure 21B:
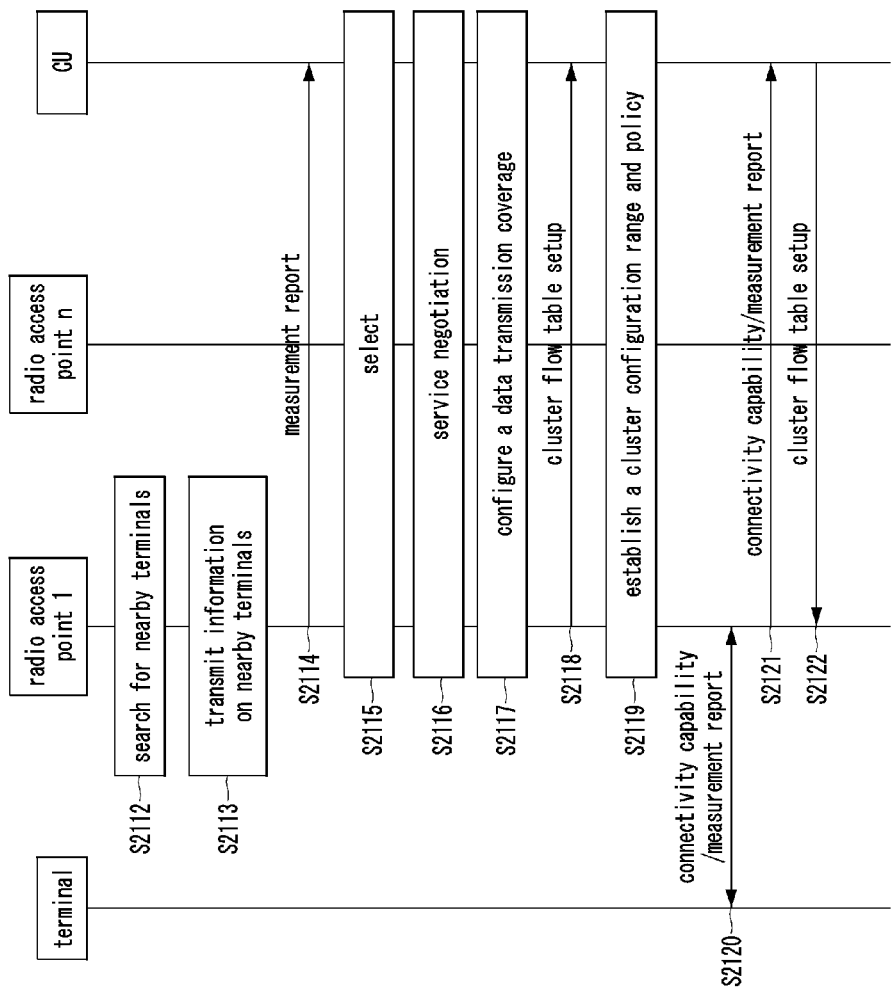

FIGS. 21A and 21B are a sequence chart illustrating a first exemplary embodiment of a terminal-centric cluster configuration method.

Referring to FIGS. 21A and 21B, a terminal-centric cluster configuration method may include a cluster coverage configuration process, cluster access and service configuration process, and cluster service update process. Here, a central control station may be included in a CU. In the cluster coverage configuration process of the terminal-centric cluster configuration method, the terminal may access a network by making a call setup. Accordingly, the network may provide communication services to the terminal (S2101). Then, an access procedure between the terminal and radio access points including a radio access point 1 may be performed (S2102). In this case, the terminal may measure received signal strength for the radio access points, including the radio access point 1, and provide a measurement result to the CU. Then, the CU may receive the measurement result for the radio access points including the radio access point 1 from the terminal. Thereafter, the CU may configure the radio access point 1, which has the maximum received signal strength, as a reference radio access point. The CU may transmit a reference radio access point configuration indication to the radio access point 1. Accordingly, the radio access point 1 may receive the reference radio access point configuration indication from the CU. Then, the radio access point 1 may proceed with a reference radio access point setup procedure (S2103). Then, the radio access point 1 may transmit a connection setup signal to the network (S2104). Accordingly, the CU may set up a connection by receiving the connection setup signal from the radio access point 1.

On the other hand, a central control station may configure a terminal-centric cluster #1 including radio access points 1 to n centered on the radio access point 1, which is the reference radio access point, based on the measurement result for the radio access points including the radio access point 1 received from the terminal. In this case, the central control station may configure the terminal-centric cluster with radio access points having received signal strengths greater than or equal to a threshold. Here, n may be a positive integer. The CU may register the radio access points 1 to n as service access points (S2105).

During the above-described process, the CU may configure a PDCP-C #1 entity for the terminal-centric cluster #1. Additionally, the CU may request the corresponding radio access points (i.e. DUs) to configure PDCP-D entities (e.g. PDCP-D #1 to PDCP-D #n) for the terminal-centric cluster #1. According to the request, the radio access points 1 to n may configure PDCP-D #1 to PDCP-D #n entities respectively. In addition, the CU may generate a cluster ID including an ID of the CU and a group ID of the radio access points 1 to n included in the terminal-centric cluster #1. The CU may provide the generated cluster ID to the radio access point 1 to n included in the terminal-centric cluster #1 and the terminal. Accordingly, the radio access points 1 to n and the terminal may receive the cluster ID of the terminal-centric cluster #1 from the CU. Then, the radio access points 1 to n and the terminal may transmit and receive data based on a cluster header including the received cluster ID. The steps S2101 to S2105 may belong to the cluster coverage configuration process.

Meanwhile, the radio access point n may transmit a link setup signal to the radio access point 1, which is the reference radio access point (S2106). Accordingly, the radio access point 1 may receive the link setup signal(s) from the radio access point n, and the like (S2107). Through this process, the radio access points 1 to n may establish links. Then, the CU and the radio access points 1 to n may set up data flows (S2107). The radio access point n or the like may synchronize with the radio access point 1 by receiving synchronization signals from the radio access point 1 (S2108). After completing the setup procedure as described above, the radio access point 1 may perform a role of the reference radio access point (S2109), configure data transmission paths with the radio access points 1 to n and the network (i.e. CU, etc.) (S2110), and provide communication services to the terminal based on the terminal-centric cluster by setting up the terminal-centric cluster (S2111).

When the cluster is formed in a multi-connectivity situation as described above, the terminal may receive a good signal from the radio access point 1, which is configured as the reference radio access point within the cluster. In this case, the terminal may receive control signals from the radio access point 1 and perform data transmission and reception through connected radio access points among protocol entities included in the configured cluster. Meanwhile, the radio access point 1 may search for nearby terminals (S2112). In addition, the radio access point 1 may transmit to the CU information on the nearby terminals acquired by performing the searching (S2113). Then, the CU may receive the information on the nearby terminals from the radio access point 1. In addition, the radio access point 1 may transmit a measurement result obtained by measuring the nearby terminals to the CU through a measurement report signal (S2114). Then, the CU may receive the measurement report signal from the radio access point 1 and obtain the measurement result for the nearby terminals.

Meanwhile, the radio access points and related protocol entities may be activated according to a movement of the terminal in a region between the radio access points 1 and 2. The radio access point 2 may be activated when it detects a terminal-specific signal. In this case, the CU's central control station may split a data transmission path, decide whether to perform duplicate transmission or split transmission depending on a multi-connectivity scheme, and indicate the decision to the radio access points 1 and 2. Accordingly, the radio access points 1 and 2 may receive the indication on the multi-connectivity scheme from the central control station, and perform connectivity operations according to the multi-connectivity scheme according to the received indication.

More specifically, the CU may determine the multi-connectivity scheme for the radio access points 1 to n constituting the terminal-centric cluster as shown in FIGS. 20A and 20B. Then, the CU may select a group of radio access points that will provide communication services to the terminal according to the determined multi-connectivity scheme (S2115). In other words, the CU may reconfigure the terminal-centric cluster with the radio access points that will provide communication services to the terminal according to the determined multi-connectivity scheme. For example, the CU may select the radio access point 1 and the radio access point 2 as a group of radio access points. In other words, the CU may reconfigure the radio access point 1 and the radio access point 2 as the terminal-centric cluster. Then, the CU may proceed with a service negotiation process according to the multi-connectivity scheme with the radio access point 1 and the radio access point 2 included in the group of radio access points (S2116). Here, the multi-connectivity may be the SFN scheme, cooperative communication scheme, frequency aggregation scheme, dual-connectivity scheme, and the like described above. Through this process, the CU may configure a data transmission coverage when the service negotiation process with the radio access points 1 and 2 is successfully completed (S2117). Here, the data transmission coverage may correspond to a radius of a cell formed by the terminal-centric cluster. Then, the CU and the radio access points 1 to n may proceed with a cluster flow table setup procedure (S21118) to set up a cluster flow table.

Meanwhile, a communication situation between the terminal and the radio access point 1 may worsen depending on a movement of the terminal or other radio conditions, and in such cases, data transmission may be interrupted. The terminal may receive control information and data from radio access points and protocol entities related to the radio access point 2. In this case, other radio access points and protocol entities in the cluster may be switched to a standby state. As the terminal moves toward the radio access points 2, 3, and n, the radio access points may connect to the multi-connectivity access points configured through the already connected previous access points by using the protocol entities in the standby state.

The terminal within the transmission coverage may maintain communication by changing a data transmission path without separate control commands. In this case, the central control station may sequentially transmit and receive data to and from the network by performing a duplicate data deletion process and data sequencing according to duplicate transmission through a PDCP-C layer of the CU among the split PDCP layers. As described above, the reference radio access point may reconfigure the cluster by receiving a report on access capabilities of the nearby terminals and transmitting the information to the central control station, and reconfigure the data transmission coverage by negotiating services therefor. Here, the steps S2106 to S2118 may belong to the cluster access and service configuration process.

Meanwhile, the CU's central control station may establish a cluster configuration range and policy when the data transmission coverage is reconfigured (S2119). Then, the terminal may periodically transmit access capability and measurement reports to the radio access point 1 (S2120). The radio access point 1 may receive the access capability and measurement report from the terminal, and transmit the received access capability and measurement report to the CU (S2121). Accordingly, the CU may update the cluster flow table by receiving the access capability and measurement report of the terminal from the radio access point 1 (S2122). Here, the steps S2119 to S2122 may belong to the cluster update process.

Figure 22:
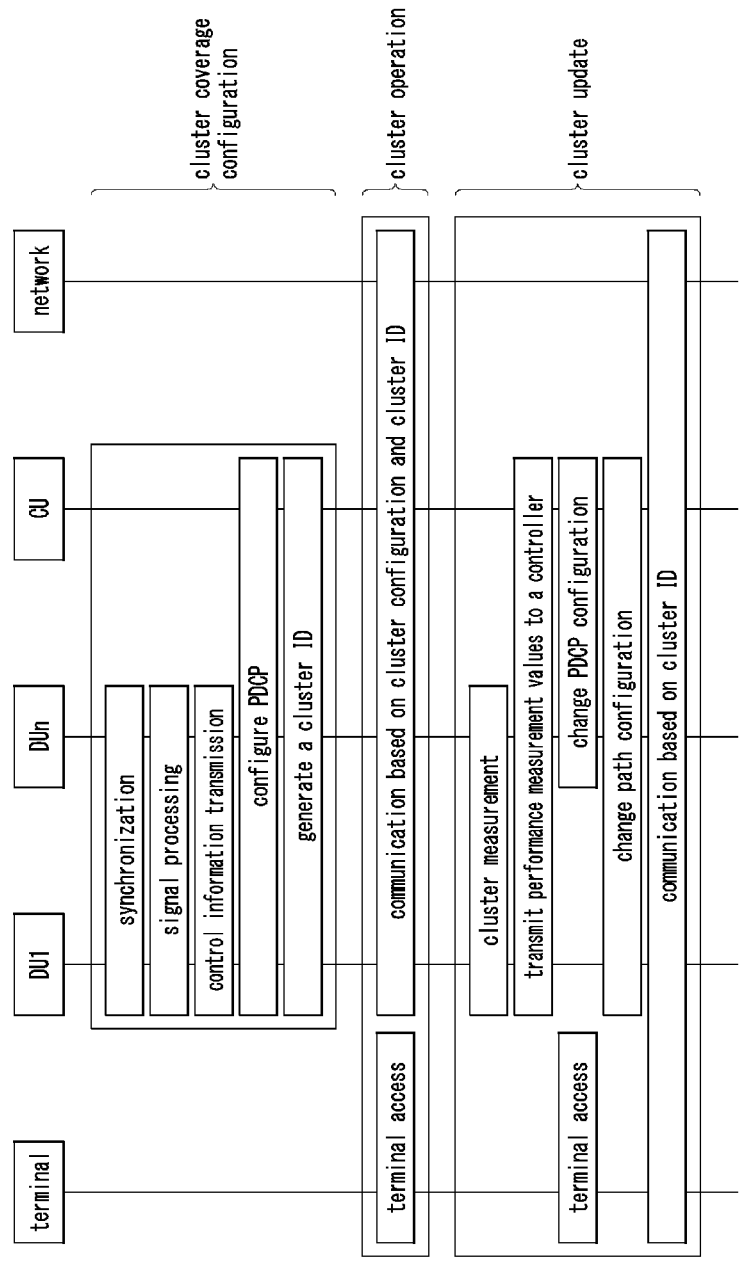
FIG. 22 is a conceptual diagram illustrating a first exemplary embodiment of a terminal-centric cluster operation method.

FIG. 22 is a conceptual diagram illustrating a first exemplary embodiment of a terminal-centric cluster operation method.

Referring to FIG. 22, a terminal-centric cluster operation method may consist of the cluster coverage configuration process, cluster operation process, and cluster update process. In the cluster coverage configuration process, a functional split-applied base station may perform synchronization, signal processing, control information transmission, and the like between the CU and DUs 1 to n to configure the cluster coverage. In addition, during the cluster coverage configuration process, the functional split-applied base station may configure a PDCP for cluster coverage configuration and generate a cluster ID.

Meanwhile, during the cluster operation process, the functional split-applied base station may support an access procedure of the terminal and form a cluster. In addition, during the cluster operation process, the functional split-applied base station may perform data communication by managing a mode of the PDCP by operating a PDCP state based on the configured cluster and the cluster ID.

Meanwhile, a case may occur where the cluster needs to be updated. Then, during the cluster update process, the functional split-applied base station may measure the performance of the cluster and inform it to the controller of the central control station. Then, the controller may receive information on the measured performance and change PDCP configuration information of the terminal and the DUs 1 to n based on the received performance measurement value. Additionally, the controller may change a packet data structure by changing configuration information of packet data. Additionally, the controller may change a PDCP path. Additionally, once the change of the path configuration is completed, the controller may perform communication based on the changed cluster ID.

Figure 23:
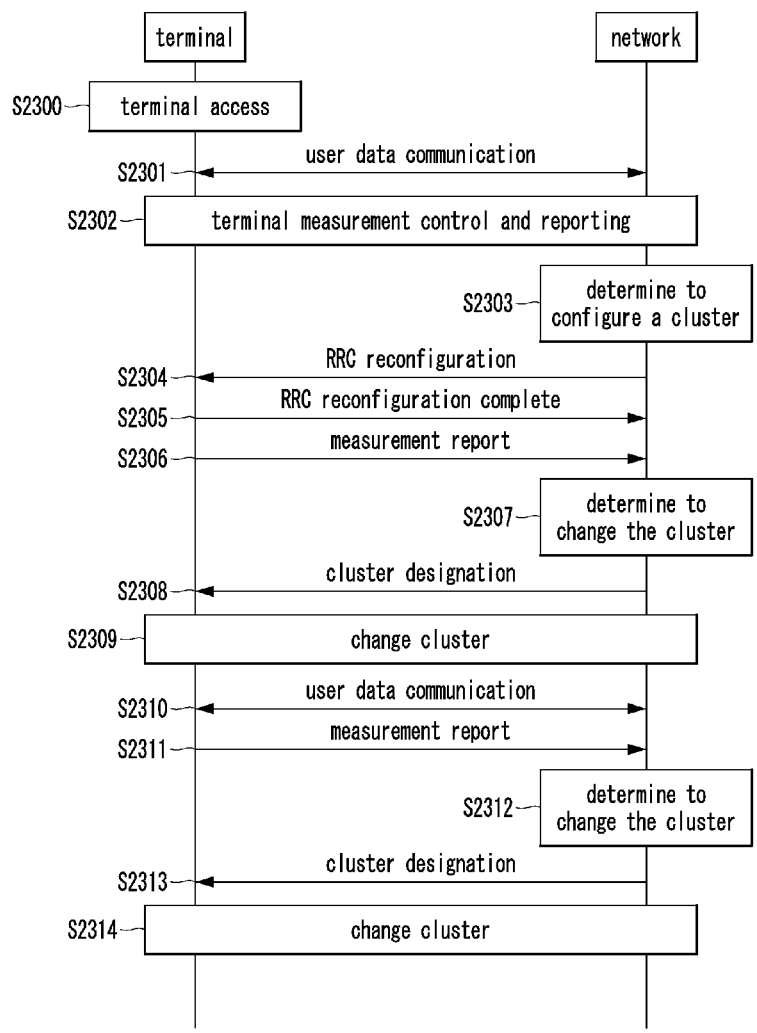
FIG. 23 is a conceptual diagram illustrating a first exemplary embodiment of a terminal-centric cluster update method.

FIG. 23 is a conceptual diagram illustrating a first exemplary embodiment of a terminal-centric cluster update method.

Referring to FIG. 23, in a terminal-centric cluster update method, the terminal may perform access to the network (S2300). Here, the network may include the radio access points 1 to n, CU, and the like. Then, the terminal may perform user data communication by transmitting and receiving user data to and from the network (S2301). Then, the terminal and the network may proceed with terminal measurement control and reporting procedures (S2302).

Meanwhile, the network may decide to configure a cluster based on information obtained for the terminal and the radio access points 1 to n through the terminal measurement reporting procedure (S2303). Accordingly, the network may configure a cluster and transmit an RRC reconfiguration signal including information on the configured cluster to the terminal (S2304). Then, the terminal may receive the RRC reconfiguration signal from the network, and configure an RRC according to the received RRC reconfiguration signal.

Thereafter, the terminal may transmit an RRC reconfiguration complete signal to the network (S2305).

Meanwhile, the terminal may perform measurements on surrounding radio access points and transmit a measurement result to the network through a measurement report signal (S2306). The network may obtain the measurement result by receiving the measurement report signal from the terminal. When the network determines that the cluster needs to be changed, the network may decide to change the cluster (S2307). Then, the network may transmit a cluster designation signal including cluster change information to the terminal (S2308). Accordingly, the terminal may receive the cluster designation signal including the cluster change information. The terminal and the network may proceed with a cluster change procedure (S2309).

Then, the terminal may perform user data communication by transmitting and receiving user data to and from the network based on the changed cluster (S2310). Thereafter, the terminal may perform measurements on surrounding radio access points and transmit a measurement result to the network through a measurement report signal (S2311). Then, the network may obtain the measurement result by receiving the measurement report signal from the terminal. When the network determines that the cluster needs to be changed, the network may decide to change the cluster to change the cluster (S2312). Additionally, the network may transmit a cluster designation signal including cluster change information to the terminal (S2313). Accordingly, the terminal may receive the cluster designation signal including the cluster change information. The terminal and the network may proceed with a cluster change procedure (S2314).

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of a central unit (CU), comprising:
   receiving, from a terminal, measurement information for radio access points;
   configuring a cluster using two or more radio access points among the radio access points based on the measurement information;
   generating first data to which a cluster header including a cluster identifier of the cluster is attached; and
   transmitting the first data to the two or more radio access points,
   wherein second data generated in the two or more radio access points includes the first data and a packet data convergence protocol (PDCP) header, the CU performs a first partial PDCP function, the two or more radio access points perform a second partial PDCP function, and the cluster header includes at least one of information on a number of PDCP service data units (SDUs), a duplicate transmission tag, or information on a length of the SDU.

2. The method according to claim 1, wherein the configuring of the cluster using the two or more radio access points among the radio access points based on the measurement information comprises:
   configuring a radio access point having a maximum received signal strength among the radio access points as a reference radio access point based on the measurement information;
   identifying one or more radio access points having a received signal strength equal to or greater than a threshold among remaining radio access points excluding the reference radio access point among the radio access points; and
   configuring the cluster including the reference radio access point and the one or more radio access points.

3. The method according to claim 1, further comprising:
   generating the cluster identifier using an identifier of the CU and a group identifier of the two or more radio access points constituting the cluster; and
   delivering the cluster identifier to the two or more radio access points.

4. The method according to claim 1, further comprising:
   determining whether to apply an intra-frequency multi-connectivity technique by determining frequency ranges of the two or more radio access points constituting the cluster; and
   reconfiguring the cluster using radio access points capable of applying the intra-frequency multi-connectivity technique among the two or more radio access points.

5. The method according to claim 1, further comprising:
   determining whether to apply a cooperative communication technique to the two or more radio access points constituting the cluster; and
   reconfiguring the cluster using radio access points capable of applying the cooperative communication technique among the two or more radio access points.

6. The method according to claim 1, further comprising:
   determining whether to apply a frequency aggregation technique to the two or more radio access points constituting the cluster; and
   reconfiguring the cluster using radio access points capable of applying the frequency aggregation technique among the two or more radio access points.

7. The method according to claim 1, further comprising:
   determining whether to apply a dual-connectivity technique to the two or more radio access points constituting the cluster; and
   reconfiguring the cluster using radio access points capable of applying the dual-connectivity technique among the two or more radio access points.

8. The method according to claim 1, further comprising:
   receiving, from the terminal, a channel quality report for the two or more radio access points constituting the cluster;
   determining transmission priorities of the two or more radio access points based on the channel quality report; and
   performing data scheduling according to the transmission priorities of the two or more radio access points.

9. The method according to claim 1, further comprising:
   receiving, from the terminal, periodic measurement reports; and
   updating the cluster based on the periodic measurement reports.

10. A central unit (CU) comprising a processor, wherein the processor causes the CU to perform:
    receiving, from a terminal, measurement information for radio access points;
    configuring a cluster using two or more radio access points among the radio access points based on the measurement information;
    generating first data to which a cluster header including a cluster identifier of the cluster is attached; and
    transmitting the first data to the two or more radio access points,
    wherein second data generated in the two or more radio access points includes the first data and a packet data convergence protocol (PDCP) header, the CU performs a first partial PDCP function, the two or more radio access points perform a second partial PDCP function, and the cluster header includes at least one of information on a number of PDCP service data units (SDUs), a duplicate transmission tag, or information on a length of the SDU.

11. The CU according to claim 10, wherein in the configuring of the cluster using the two or more radio access points among the radio access points based on the measurement information, the processor further causes the CU to perform:
    configuring a radio access point having a maximum received signal strength among the radio access points as a reference radio access point based on the measurement information;
    identifying one or more radio access points having a received signal strength equal to or greater than a threshold among remaining radio access points excluding the reference radio access point among the radio access points; and
    configuring the cluster including the reference radio access point and the one or more radio access points.

12. The CU according to claim 10, wherein the processor further causes the CU to perform:
  generating the cluster identifier using an identifier of the CU and a group identifier of the two or more radio access points constituting the cluster; and
  delivering the cluster identifier to the two or more radio access points.

13. The CU according to claim 10, wherein the processor further causes the CU to perform:
  determining whether to apply an intra-frequency multi-connectivity technique by determining frequency ranges of the two or more radio access points constituting the cluster; and
  reconfiguring the cluster using radio access points capable of applying the intra-frequency multi-connectivity technique among the two or more radio access points.

14. The CU according to claim 10, wherein the processor further causes the CU to perform:
  determining whether to apply a cooperative communication technique to the two or more radio access points constituting the cluster; and
  reconfiguring the cluster using radio access points capable of applying the cooperative communication technique among the two or more radio access points.

15. The CU according to claim 10, wherein the processor further causes the CU to perform:
  determining whether to apply a frequency aggregation technique to the two or more radio access points constituting the cluster; and
  reconfiguring the cluster using radio access points capable of applying the frequency aggregation technique among the two or more radio access points.

16. The CU according to claim 10, wherein the processor further causes the CU to perform:
  determining whether to apply a dual-connectivity technique to the two or more radio access points constituting the cluster; and
  reconfiguring the cluster using radio access points capable of applying the dual-connectivity technique among the two or more radio access points.

* * * * *